(12) United States Patent
Bradfield

(10) Patent No.: US 12,162,343 B2
(45) Date of Patent: Dec. 10, 2024

(54) DRIVE MODULE WITH IMPROVED EFFICIENCY

(71) Applicant: BorgWarner Inc., Auburn Hills, MI (US)

(72) Inventor: Michael D. Bradfield, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 1083 days.

(21) Appl. No.: 17/075,768

(22) Filed: Oct. 21, 2020

(65) Prior Publication Data

US 2021/0129660 A1     May 6, 2021

Related U.S. Application Data

(60) Provisional application No. 62/929,844, filed on Nov. 2, 2019, provisional application No. 62/930,028, filed on Nov. 4, 2019.

(51) Int. Cl.
*B60K 11/04*     (2006.01)
*B60K 1/00*      (2006.01)
(Continued)

(52) U.S. Cl.
CPC ............... *B60K 11/04* (2013.01); *B60K 1/00* (2013.01); *F16H 57/02* (2013.01);
(Continued)

(58) Field of Classification Search
CPC .......... H02K 7/116; H02K 9/227; H02K 5/20; H02K 5/18; H02K 9/26; H02K 9/19;
(Continued)

(56) References Cited

U.S. PATENT DOCUMENTS 3,299,738 A * 1/1967 Sand ................. F16H 41/30
                                                74/606 R
5,197,421 A * 3/1993 Hara ................. F01L 1/34406
                                                123/90.31
(Continued)

FOREIGN PATENT DOCUMENTS

CN         1615570 A      5/2005
CN       101611527 B     11/2012
(Continued)

OTHER PUBLICATIONS

International Search Report and Written Opinion of the International Searching Authority, PCT/US2020/056552, Feb. 3, 2021, 12 pages.

*Primary Examiner* — Alex W Mok
(74) *Attorney, Agent, or Firm* — Bose McKinney & Evans LLP

(57) ABSTRACT

A drive module for a vehicle including an electric machine, an inverter, a gearing assembly, and a cooling system. A first housing member thermally coupled with the inverter has a first set of heat exchange surfaces and a second housing member thermally coupled with the electric machine has a second set of heat exchange surfaces. The first and second sets of heat exchange surfaces each project into an interior volume cooled by an externally supplied liquid coolant which thereby defines a heat exchanger. A lower oil sump for collecting oil used to cool the electric machine may also include heat exchange surfaces projecting into the same heat exchanger. The gearbox may include an elevated oil sump which is supplied by the same oil pump circulating oil on the electric machine wherein the elevated oil sump gravity feeds oil onto selected surfaces within the gearbox.

26 Claims, 37 Drawing Sheets

(51) Int. Cl.

| | | |
|---|---|---|
| *F16H 57/02* | (2012.01) | |
| *F16H 57/04* | (2010.01) | |
| *F16N 7/02* | (2006.01) | |
| *F16N 7/38* | (2006.01) | |
| *F16N 13/00* | (2006.01) | |
| *F16N 25/00* | (2006.01) | |
| *F16N 31/00* | (2006.01) | |
| *F16N 39/02* | (2006.01) | |
| *H02K 5/18* | (2006.01) | |
| *H02K 5/20* | (2006.01) | |
| *H02K 7/116* | (2006.01) | |
| *H02K 9/19* | (2006.01) | |
| *H02K 9/193* | (2006.01) | |
| *H02K 9/26* | (2006.01) | |
| *H02K 11/33* | (2016.01) | |

(52) U.S. Cl.
CPC ..... *F16H 57/0415* (2013.01); *F16H 57/0436* (2013.01); *F16H 57/045* (2013.01); *F16H 57/0465* (2013.01); *F16H 57/0471* (2013.01); *F16H 57/0476* (2013.01); *F16N 7/02* (2013.01); *F16N 7/38* (2013.01); *F16N 13/00* (2013.01); *F16N 25/00* (2013.01); *F16N 31/00* (2013.01); *F16N 39/02* (2013.01); *H02K 5/18* (2013.01); *H02K 5/20* (2013.01); *H02K 7/116* (2013.01); *H02K 9/19* (2013.01); *H02K 9/193* (2013.01); *H02K 9/26* (2013.01); *H02K 11/33* (2016.01); *B60K 2001/006* (2013.01); *F16H 2057/02034* (2013.01); *F16N 2210/04* (2013.01); *F16N 2210/12* (2013.01); *F16N 2210/18* (2013.01); *F16N 2280/02* (2013.01)

(58) Field of Classification Search
CPC .... H02K 11/33; H02K 9/193; F16H 57/0476; F16H 57/0445; F16H 57/0417; F16H 57/02; F16H 57/0465; F16H 57/045; F16H 57/0415; F16H 57/0471; F16H 57/0436; F16H 57/0469; F16H 2057/02034; F16H 57/0457; F16N 39/02; F16N 7/02; F16N 25/00; F16N 13/00; F16N 7/38; F16N 31/00; F16N 2210/04; F16N 2210/18; F16N 2280/02; F16N 2210/12; B60K 11/04; B60K 1/00; B60K 2001/006; B60K 2001/003; B60K 11/02; B60Y 2400/61

USPC .......................................................... 310/53
See application file for complete search history.

(56) References Cited

U.S. PATENT DOCUMENTS

| | | | | |
|---|---|---|---|---|
| 5,845,756 | A * | 12/1998 | Dairokuno | B60K 23/02 192/85.61 |
| 6,201,365 | B1 * | 3/2001 | Hara | B60L 1/02 903/952 |
| 6,323,613 | B1 * | 11/2001 | Hara | H02K 16/00 903/952 |
| 7,102,260 | B2 | 9/2006 | Takenaka et al. | |
| 7,749,122 | B2 * | 7/2010 | Yoneyama | F16H 61/12 475/116 |
| 7,946,118 | B2 * | 5/2011 | Hippen | F02B 39/14 184/6.24 |
| 8,378,550 | B2 | 2/2013 | Bradfield | |
| 8,629,585 | B2 | 1/2014 | Bradfield | |
| 8,866,353 | B2 | 10/2014 | Miyama et al. | |
| 9,306,433 | B2 * | 4/2016 | Sten | H02K 9/193 |
| 9,762,106 | B2 * | 9/2017 | Gauthier | H02K 1/32 |
| 9,903,242 | B2 | 2/2018 | Long et al. | |
| 9,960,654 | B2 | 5/2018 | Bradfield | |
| 10,389,211 | B2 | 8/2019 | Bradfield | |
| 10,621,541 | B2 | 4/2020 | Andres et al. | |
| 2004/0045749 | A1 | 3/2004 | Jaura et al. | |
| 2011/0298316 | A1 | 12/2011 | Bradfield | |
| 2011/0298317 | A1 | 12/2011 | Bradfield | |
| 2011/0298318 | A1 | 12/2011 | Bradfield | |
| 2011/0304227 | A1 | 12/2011 | Bradfield | |
| 2012/0074799 | A1 | 3/2012 | Bradfield | |
| 2012/0080117 | A1 | 4/2012 | Bradfield | |
| 2012/0091834 | A1 | 4/2012 | Bradfield | |
| 2013/0049495 | A1 | 2/2013 | Matsuo | |
| 2013/0119793 | A1 | 5/2013 | Hofkirchner et al. | |
| 2013/0214624 | A1 * | 8/2013 | Kubes | H02K 9/19 310/54 |
| 2017/0144532 | A1 * | 5/2017 | Tokozakura | B60K 6/445 |
| 2019/0291570 | A1 | 9/2019 | Tang et al. | |
| 2020/0227977 | A1 | 7/2020 | Bradfield | |
| 2020/0389070 | A1 | 12/2020 | Bradfield | |

FOREIGN PATENT DOCUMENTS

| | | |
|---|---|---|
| DE | 102011084031 A1 | 4/2013 |
| JP | H0898464 A | 4/1996 |
| JP | 2004-260898 A | 9/2004 |
| JP | 2008092727 A | 4/2008 |
| JP | 2014007884 A | 1/2014 |
| KR | 10-2018-0066416 | 6/2018 |

* cited by examiner

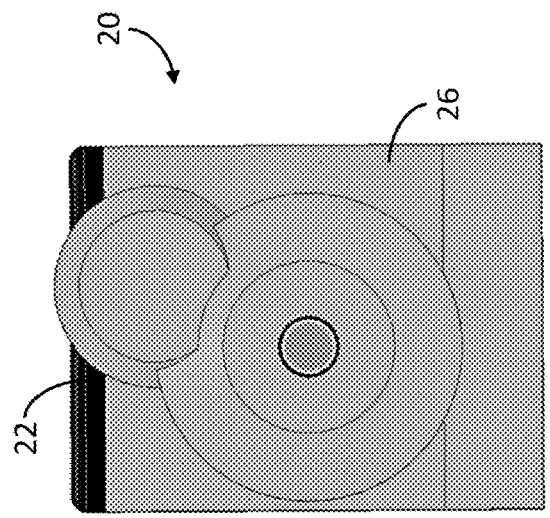
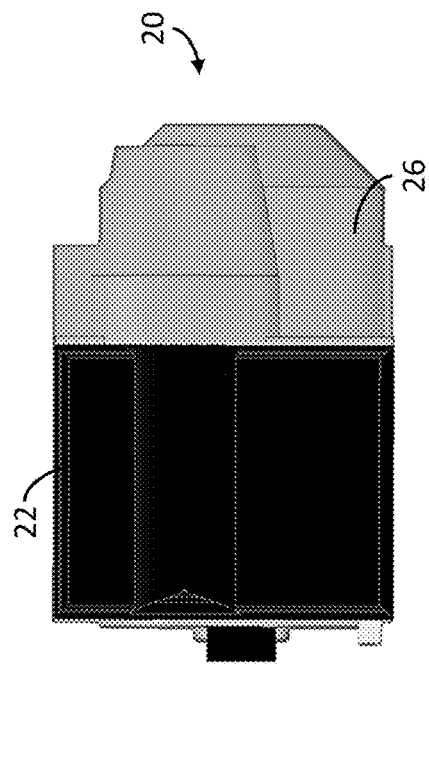
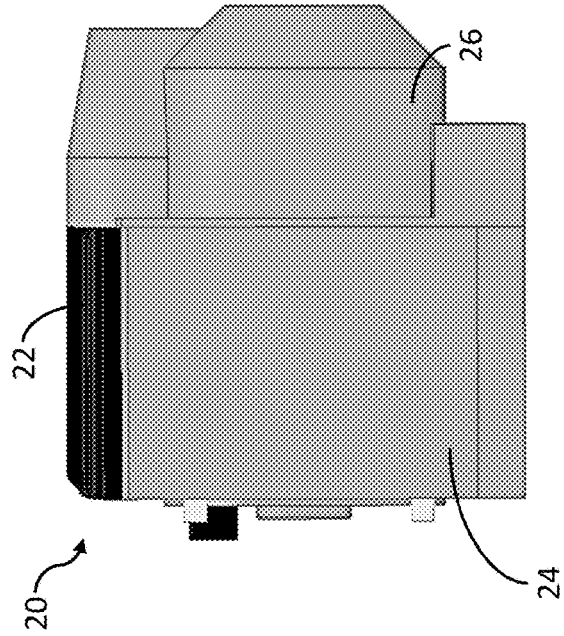

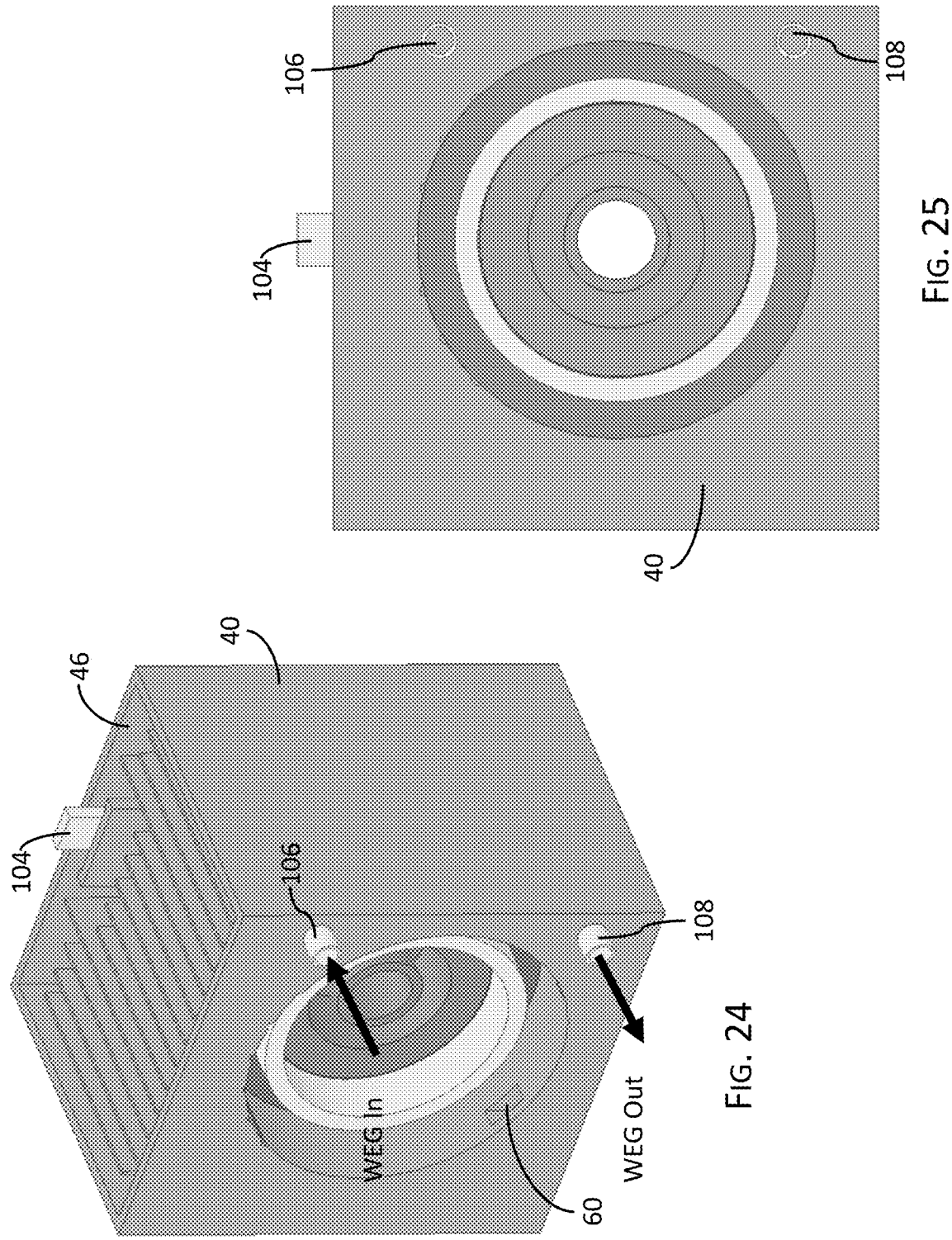

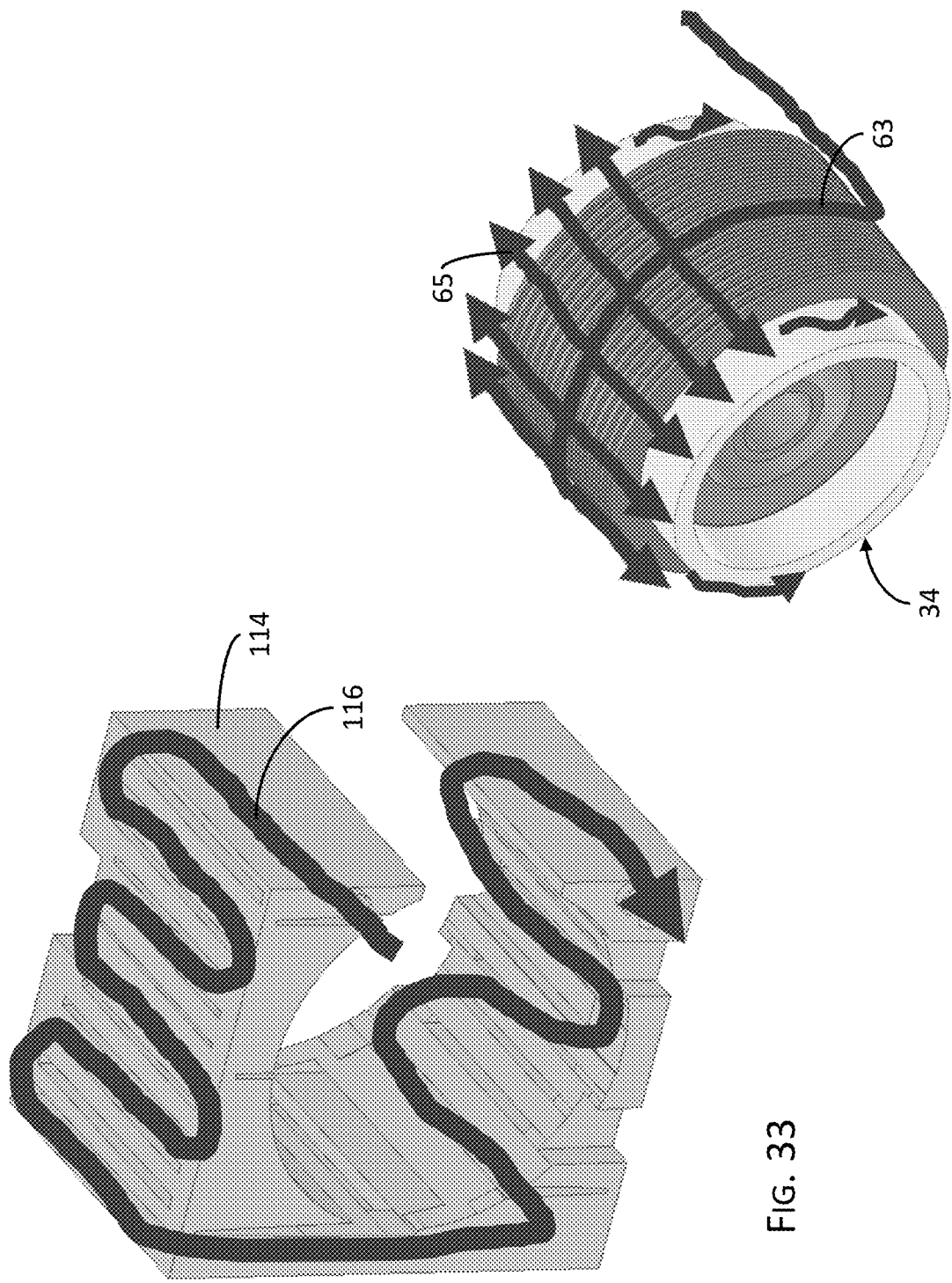

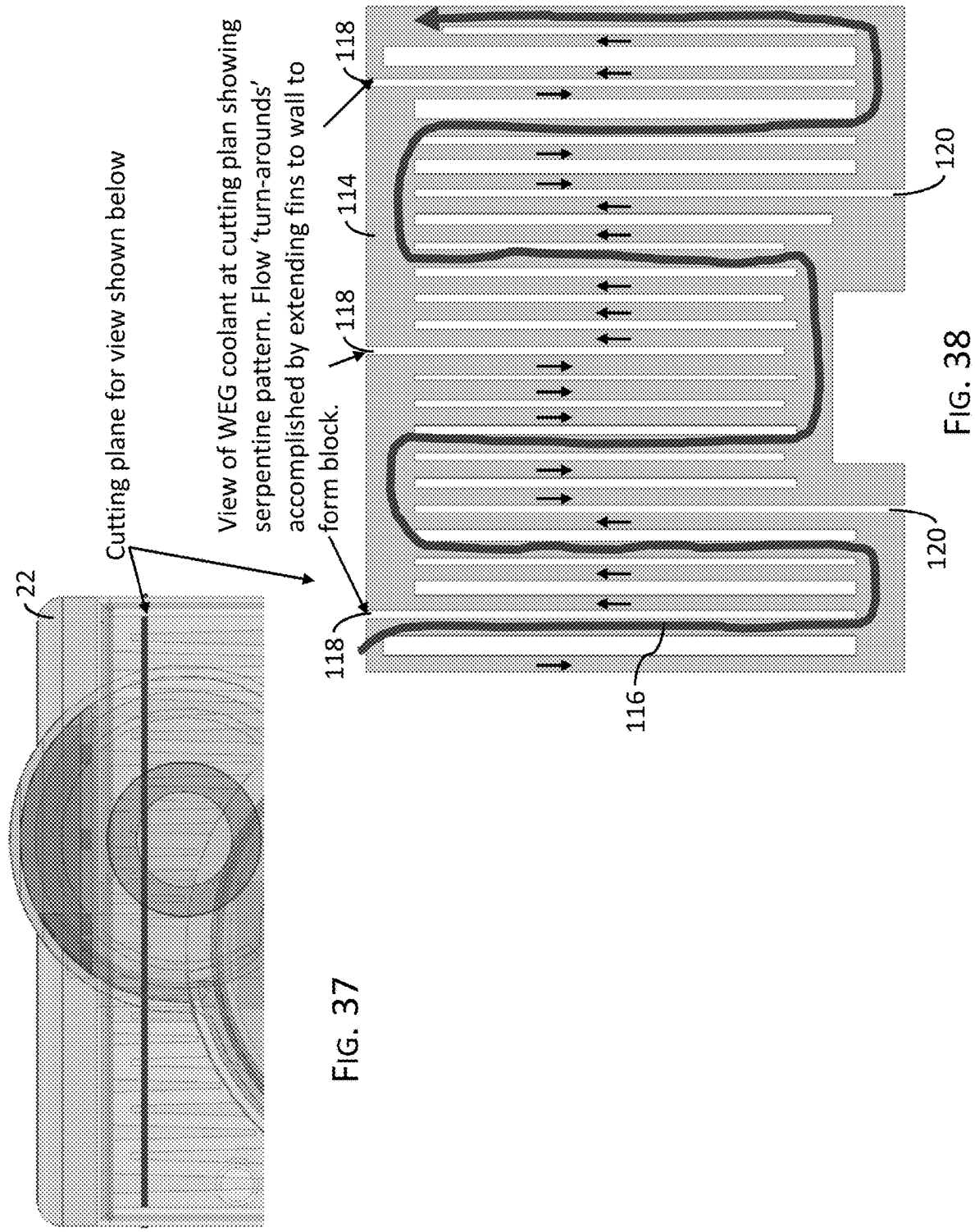

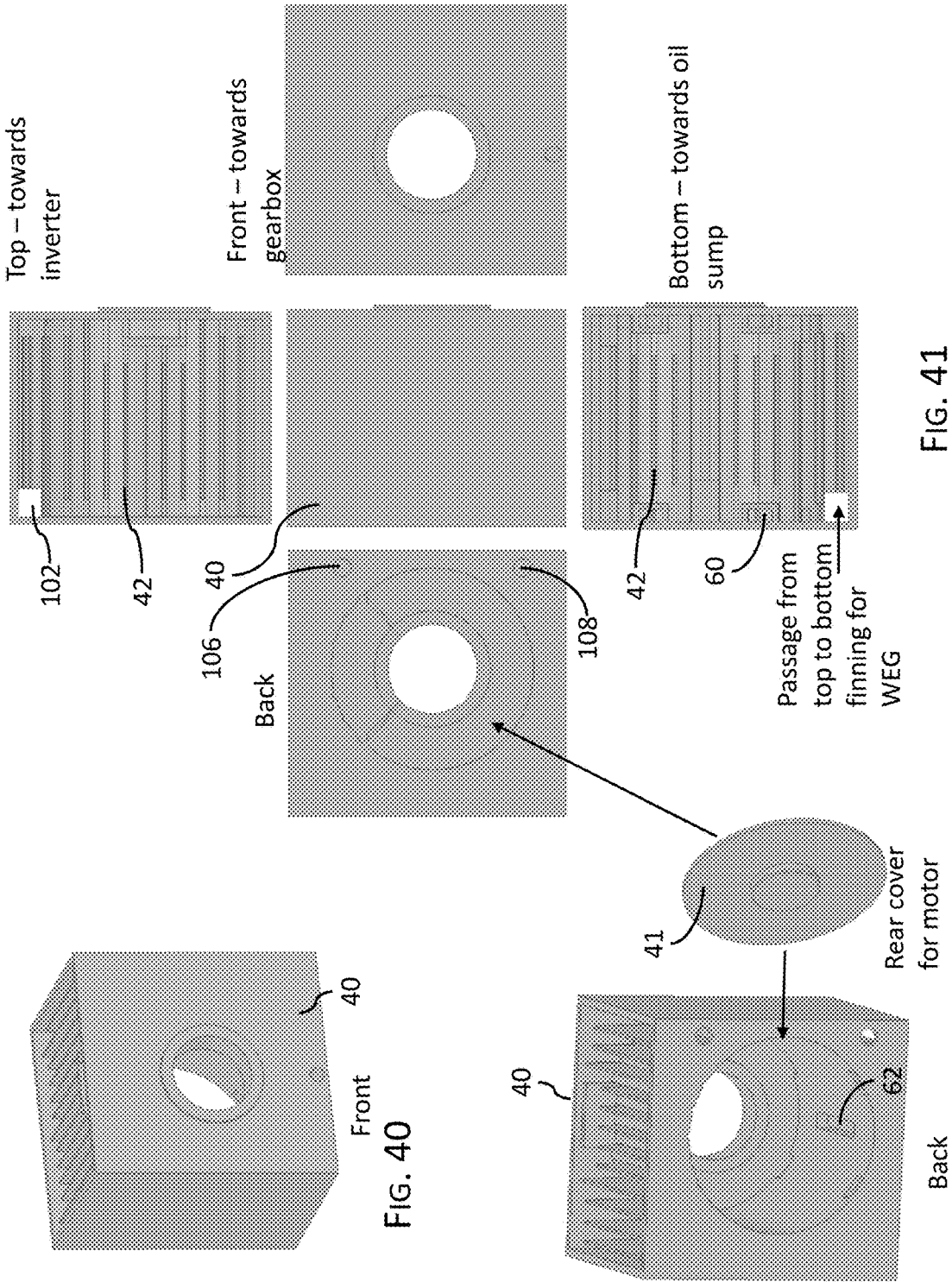

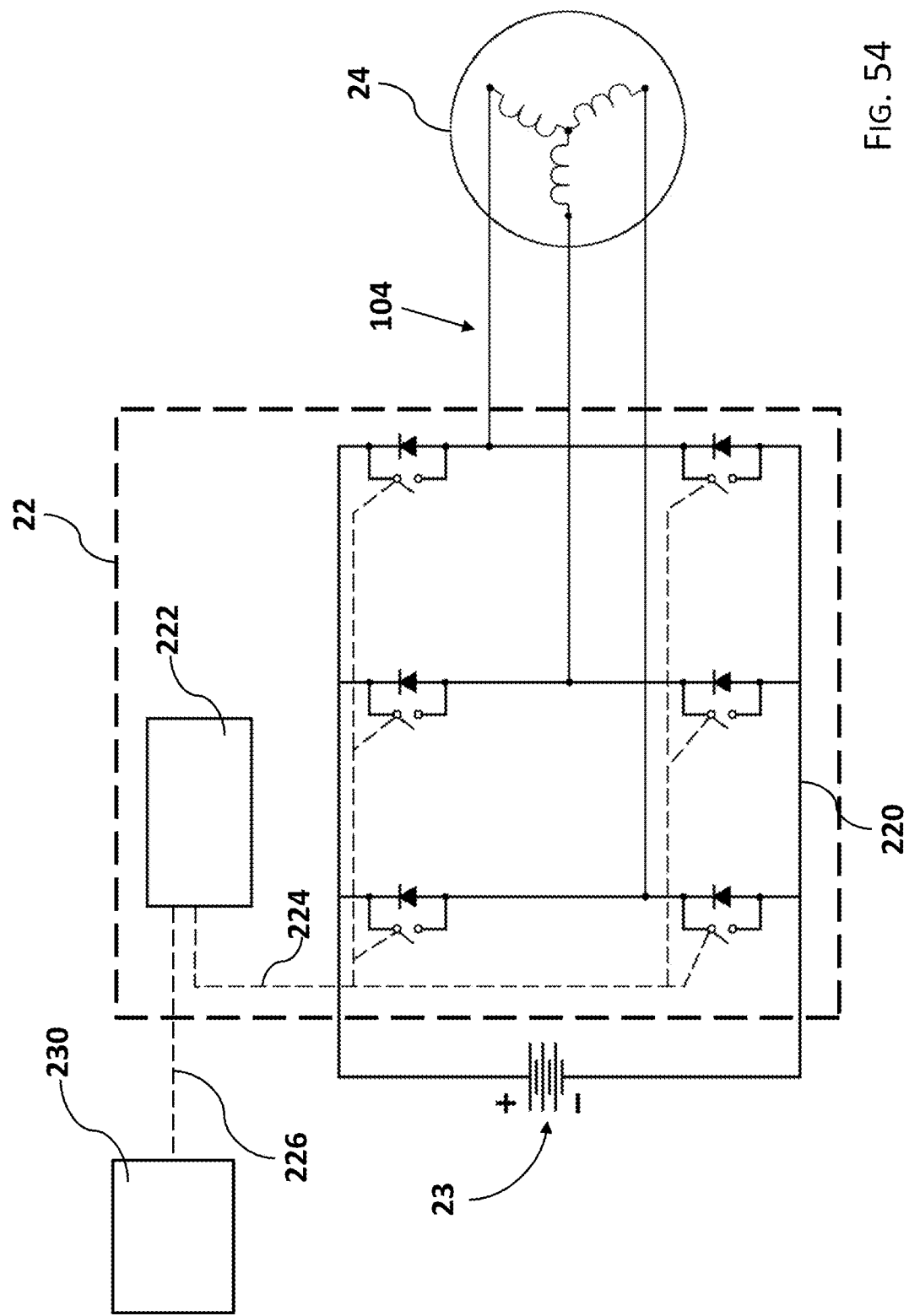

DRIVE MODULE WITH IMPROVED EFFICIENCY

CROSS REFERENCE TO RELATED APPLICATIONS

This application claims priority under 35 U.S.C. 119(e) of U.S. provisional patent application Ser. No. 62/929,844 filed on Nov. 2, 2019 entitled VEHICLE POWER DRIVE MODULE WITH INTEGRATED LIQUID TO LIQUID HEAT EXCHANGER and of U.S. provisional patent application Ser. No. 62/930,028 filed on Nov. 4, 2019 entitled DRIVE MODULE WITH IMPROVED EFFICIENCY the entire disclosures of both of which are hereby incorporated herein by reference.

BACKGROUND

Electric and hybrid vehicles are increasingly using modules including an electric machine, inverter and gearbox. Such modules can generate significant heat during operation and improvements concerning the cooling of such modules is desirable.

SUMMARY

The present application discloses a thermal system for an integrated electric machine, inverter and gearbox module for an electric or hybrid electric vehicle. The system uses an external fluid coolant and an internal fluid coolant. In the illustrative embodiment, the external fluid coolant is a water-ethylene glycol (WEG) coolant such as a conventional coolant used in a motor vehicle and commonly referred to as "anti-freeze". In the illustrative embodiment, the internal fluid coolant is an oil which cools both the electric machine, the gear assembly, and the bearings rotatably supporting the electric machine and gear assembly.

The invention comprises, in one form thereof, a drive module for a vehicle wherein the module includes an electric machine; a voltage source inverter operably coupled with the electric machine; and a cooling system for the module, the cooling system including a first housing member 50 thermally coupled with the inverter and having a first set of heat exchange surfaces 52, a second housing member 40 thermally coupled with the electric machine and having a second set of heat exchange surfaces 42, the first and second sets of heat exchange surfaces each projecting into an interior volume whereby a liquid coolant introduced into the interior volume removes heat from both the first and second set of heat exchange surfaces.

In some embodiments, the drive module further includes an oil pump, the oil pump circulating an oil to cool the electric machine wherein the oil collects in a gravity fed, lower oil sump wherein it supplies the oil pump; and a third housing member defining a wall of the lower oil sump and being thermally coupled with the oil collected in the oil sump, the third housing member 55 further including a third set of heat exchange surfaces 56 projecting into the interior space in which the liquid coolant is circulated.

In some embodiments including an oil pump, the third housing member may further include a fourth set of heat exchange surfaces 58 which project into lower oil sump. In such an embodiment, the third and fourth sets of heat exchange surfaces may be disposed opposite each other and project in opposite directions.

In some embodiments including an oil pump, the oil pump may circulate oil about a stator core of the electric machine and the radially exterior surface of the stator core may define a plurality of heat exchange fins.

In some embodiments including an oil pump, the drive module may further include a gearing assembly operably coupled with the electric machine; and an upper oil sump wherein the oil pump supplies oil to the upper oil sump and the oil is gravity fed from the upper oil sump to the gearing assembly. In such an embodiment, the oil pump may be a variable capacity oil pump with the oil pump being operably coupled with at least one solenoid operated valve, the at least one solenoid operated valve adjusting the relative proportion of the oil being supplied by the oil pump to the electric machine and the upper oil sump. In some embodiments, the upper oil sump defines one or more openings that supply oil to selected surfaces on the gear assembly via gravity. The selected surfaces may include surfaces disposed on gears and bearings. The at least one housing member may also define an oil gutter for directing oil from the upper oil sump to one of the selected surfaces.

In some embodiments of the drive module, the housing members defining an outer boundary of the interior volume for receiving the liquid coolant define an outer boundary having a parallelepiped shape and the housing members defining the interior volume for receiving the liquid coolant that are in thermal communication with the electric machine define an inner boundary of the interior volume having a cylindrical shape and wherein the first, second and third set of heat exchange surfaces all define fins projecting into the interior volume wherein the fins projecting into the interior volume define a coolant flow passageway wherein the coolant flow passageway has dimensions that vary but defines a constant cross sectional area in a plane perpendicular to the direction of fluid flow through the passageway.

The invention comprises, in another form thereof, an oil cooled assembly that includes at least one heat generating member; an oil pump, the oil pump circulating an oil to cool the heat generating member wherein the oil collects by gravity in a lower oil sump and wherein the lower oil sump supplies oil to the pump; a cooling assembly wherein a liquid coolant is circulated through an interior volume of the cooling assembly to remove heat from a housing member thermally coupled to the heat generating member; and wherein the lower oil sump is partially defined by a sump housing member thermally coupled with the oil collected in the lower oil sump, the sump housing member including a first set of heat exchange surfaces projecting into the interior space in which the liquid coolant is circulated whereby the liquid coolant removes heat from the sump housing member.

In some embodiments, the sump housing member includes a second set of heat exchange surfaces projecting into the oil collected in the lower oil sump to thereby thermally couple the sump housing member with the oil.

In some embodiments, the heat generating member is an electric machine.

In some embodiments, the oil cooled assembly is adapted to supply oil to a second application and wherein the oil pump is a variable capacity oil pump and wherein the oil cooled assembly further includes a solenoid activated valve assembly disposed between the oil pump and the heat generating member and the second application wherein oil discharged from the pump is divided by the solenoid activated valve assembly and the divided flow is conveyed by a first oil discharge line to supply oil to the heat generating member and by a second discharge line to supply oil to the second application and the solenoid activated valve assembly further comprises at least one solenoid activated valve which adjustably proportions the oil discharged from the pump between the first and second discharge lines.

In such an embodiment, the heat generating member may take the form of an electric machine and may further include a gearing arrangement drivingly coupled with the electric machine wherein the gearing arrangement is the second application.

In some embodiments, the at least one solenoid activated valve comprises a first solenoid activated valve disposed in the first discharge line and a second solenoid activated valve disposed in the second discharge line. In other embodiments, the at least one solenoid activated valve consists solely of a single solenoid activated valve.

In those embodiments including a gearing arrangement, the gearing arrangement may be disposed in a gearbox assembly, the gearbox assembly including an upper oil sump wherein the second discharge line supplies oil to the upper oil sump and the upper oil sump defines one or more openings that supply oil to selected surfaces within the gearbox box assembly via gravity. In some embodiments, the selected surfaces are disposed on gears and bearings and at least one housing member of the gearbox defines an oil gutter for directing oil from the upper oil sump to one of the selected surfaces.

The invention comprises, in another form thereof, a gearbox assembly that includes a gearing arrangement comprising at least two gear members and a rotating shaft supported by a bearing; and an upper oil sump wherein an oil pump supplies oil to the upper oil sump and the upper oil sump defines one or more openings that supply oil to selected surfaces of the gearing arrangement within the gearbox assembly via gravity.

In some embodiments, the selected surfaces include surfaces disposed on the gear members and the bearing and at least one housing member of the gearbox defines an oil gutter for directing oil from the upper oil sump to one of the selected surfaces.

In some embodiments, the assembly is adapted to supply a second application with oil discharged by the oil pump and wherein the oil pump is a variable capacity oil pump fed by a lower oil sump which collects oil via gravity from both the gearbox assembly and the second application, and the gearbox assembly further includes a solenoid activated valve assembly disposed between the oil pump and the upper oil sump and the second housing wherein oil discharged from the pump is divided by the solenoid activated valve assembly and the divided flow is conveyed by a first oil discharge line to supply oil to the upper oil sump and by a second discharge line to supply oil to the second housing and the solenoid activated valve assembly further comprises at least one solenoid activated valve which adjustably proportions the oil discharged from the pump between the first and second discharge lines.

The invention comprises, in yet another form thereof, an oil pump assembly for adjustably supplying two separate applications wherein the assembly includes a variable capacity oil pump supplying oil to a first application and a second application; and a solenoid activated valve assembly disposed between the oil pump and the first and second applications wherein oil discharged from the oil pump is divided by the solenoid activated valve assembly and the divided flow is conveyed by a first oil discharge line to supply oil to the first application and by a second discharge line to supply oil to the second application and the solenoid activated valve assembly further comprises at least one solenoid activated valve which adjustably proportions the oil discharged from the pump between the first and second discharge lines.

In some embodiments of the oil pump assembly, the at least one solenoid activated valve comprises a first solenoid activated valve disposed in the first discharge line and a second solenoid activated valve disposed in the second discharge line. In other embodiments of the oil pump assembly, the at least one solenoid activated valve consists solely of a single solenoid activated valve.

In some embodiments, the oil pump assembly further includes control circuitry which controls operation of the oil pump to adjust the discharge rate of the pump and controls operation of the solenoid activated valve assembly to adjust the relative amounts of the oil distributed by the first and second discharge lines to thereby independently adjust the flow rate of oil in the first and second discharge lines.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above mentioned and other features of this invention, and the manner of attaining them, will become more apparent and the invention itself will be better understood by reference to the following description of an embodiment of the invention taken in conjunction with the accompanying drawings, wherein:

FIG. 7 is a top view of the power drive module.

FIG. 8 is a side view of the power drive module.

FIG. 9 is an end view of the power drive module.

FIG. 24 is a perspective view of the electric machine housing.

FIG. 25 is an end view of the electric machine housing.

FIG. 33 is a perspective view illustrating the flow of WEG coolant.

FIG. 34 is a perspective view illustrating the flow of oil around the electric machine stator.

FIG. 37 is a partial side view of the module.

FIG. 38 is a cross sectional view showing only the WEG coolant volume taken along the cross sectional line indicated in FIG. 37.

FIG. 40 is a front perspective view of the electric machine housing.

FIG. 41 includes a side view in the center, front and back views, a top view and a bottom view, all of the electric machine housing.

FIG. 42 is a rear perspective view of the electric machine housing.

FIG. 54 is a schematic diagram of the electric machine and inverter.

Figure 2:
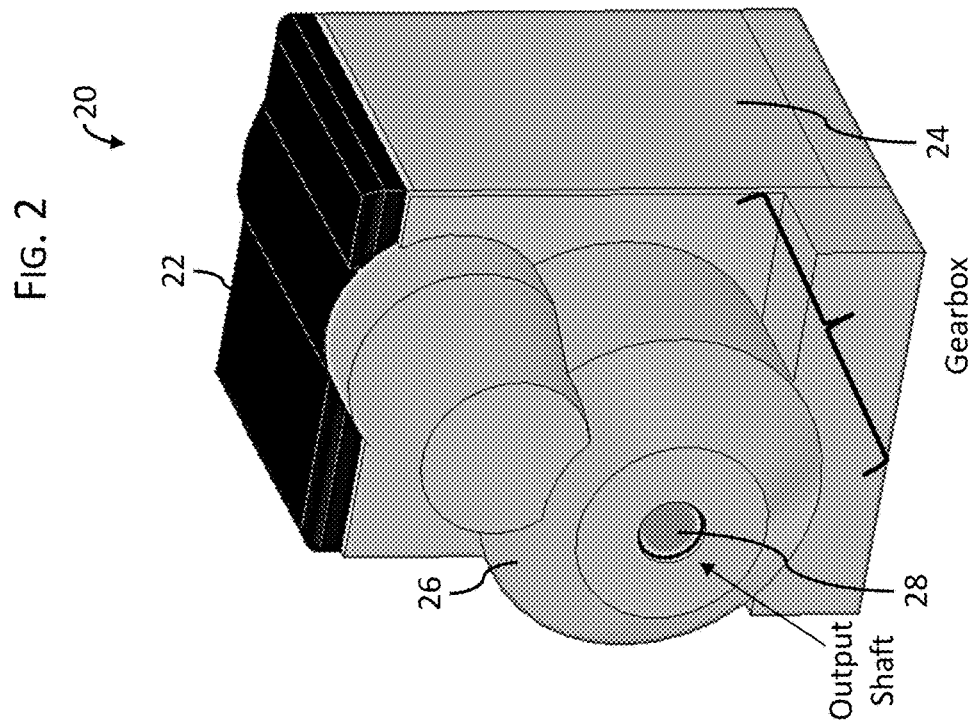
FIG. 2 is another perspective view of the power drive module.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

The WEG to oil heat exchanger is formed by the electric machine housing to thereby increase the thermal effectiveness of the system and reduce costs. The gearbox features a novel upper oil sump that selectively applies oil to the bearings and gears. This approach reduces the amount of energy required to distribute the oil within the housing compared to conventional splashing of oil throughout the entire housing by slinging oil from the gears.

In the exemplary embodiment, the internal circulation of cooling oil is driven by an electric pump that has a variable speed and duty cycle to adjust flow rates to match the need for cooling oil and thereby improve system efficiency by minimizing pumping losses.

The oil is used to cool both the gears and the electric machine and losses are further reduced in the exemplary embodiment by employing a solenoid controlled valve to throttle oil flow from the pump to the electric machine based on the demand for cooling oil.

The exemplary embodiment provides several useful features. For example, in the exemplary embodiment, the heat exchange surfaces coupled to the inverter and electric machine both project into the same space such that an external WEG coolant cools both the electric machine and the inverter simultaneously. In the exemplary embodiment, a first set of cooling fins transferring heat from the inverter projects into a coolant volume and a second set of fins transferring heat from the electric machine projects into the same coolant volume wherein the first and second cooling fins jointly define the coolant passage and are alternately arranged within the coolant volume to define the passage.

Conventionally, when using a WEG coolant to cool an inverter and electric machine, the WEG coolant would serially cool the inverter and then electric machine with the WEG coolant first flowing to and through a cooling system for the inverter and then, after exiting the inverter cooling system, flowing to and through a cooling system for the electric machine.

In the exemplary embodiment, the WEG coolant is also used to cool the internal oil which is used for both cooling and lubrication of the electric machine and gear assembly.

These cooling features directly contacted by the WEG coolant for cooling the electric machine and the gear assembly are formed by the cast housing and the bottom oil sump of the electric machine. The cast housing and oil sump directly contact the oil on a surface opposite that contacted by the WEG coolant. This arrangement improves thermal efficiency by reducing the thermal gradient necessary to transfer heat from the oil to the WEG coolant.

Further, by integrating this heat exchanger function directly into the cast aluminum housings of the exemplary embodiment and directly cooling the oil in the bottom oil sump, the need for a separate, and expensive, WEG to oil heat exchanger mounted externally to the drive module is eliminated. Moreover, these features of the exemplary embodiment not only provide value individually but also work together to create an energy efficient, yet power dense and inexpensive, thermal design for the overall module.

For example, it is conventional to pump oil from a sump to an external heat exchanger to cool the oil. Not only does the exemplary embodiment eliminate the need for such an external heat exchanger it also reduces the demand placed on the oil pump thereby reducing the necessary maximum capacity of the oil pump and also reducing the energy required to operate the oil pump during operation of the system.

The exemplary embodiment also employs an electric machine having a stator core wherein the radially exterior surface of the stator core is ribbed or finned with some of the laminations having a larger diameter than others instead of a smooth cylindrical radially exterior surface to thereby provide for oil flow in direct contact with the finned radially exterior surface of the stator core and also provides a relatively large surface area for the oil to contact. This arrangement provides greater thermal efficiency than an arrangement wherein the stator core is mounted within a housing and the oil indirectly cools the stator core through the housing. This arrangement also reduces the demand for pumping cooling oil and thereby reduces pumping energy losses. As further discussed below, the thermal efficiency of the exemplary embodiment allows the WEG coolant alone to be sufficient to cool the electric machine without using the oil pump to circulate oil about the stator core under many operating conditions.

Another advantageous feature of the exemplary embodiment is the upper oil sump for the gearbox. The use of an elevated oil sump allows oil to be gravity fed directly onto specific targeted areas that require such oil for lubrication and/or cooling purposes. The use of such an elevated oil sump is accomplished by the use of the oil pump. Compared to a splash cooled design having only an oil sump located at the bottom of the housing interior which has its oil spread throughout the housing interior for lubrication and cooling purposes by the agitation and flinging of the oil by the passage of rotating gears through the oil collected in the sump, the use of the elevated sump of the exemplary embodiment improves the efficiency of the system. This improvement in efficiency is achieved by reducing energy required to circulate the oil and eliminating the splashing of oil on surfaces that don't require cooling or lubrication. In the exemplary embodiment, an oil pump is shared with the electric machine to circulate oil for both the electric machine and gear assembly. The oil pump is electrically controlled and has a variable speed and duty cycle so that it can be operated to match demand. Furthermore, a solenoid is used in the exemplary embodiment to adjust the relative flow of oil from the pump to the electric machine and the elevated oil sump of the gearbox. This allows the oil flow to be adjusted for both the electric machine and gearbox to meet the individual needs of each and thereby efficiently operate the oil pump.

These improvements in the efficiency of the system are particularly advantageous in hybrid and electric vehicles because such efficiencies reduce the electrical load created by the system, e.g., the load generated by the oil pump. These efficiencies, in turn, reduce the load placed on the battery pack of the vehicle and may thereby increase the electrically powered range of the vehicle and/or reduce the necessary capacity of the battery pack.

Figure 1:
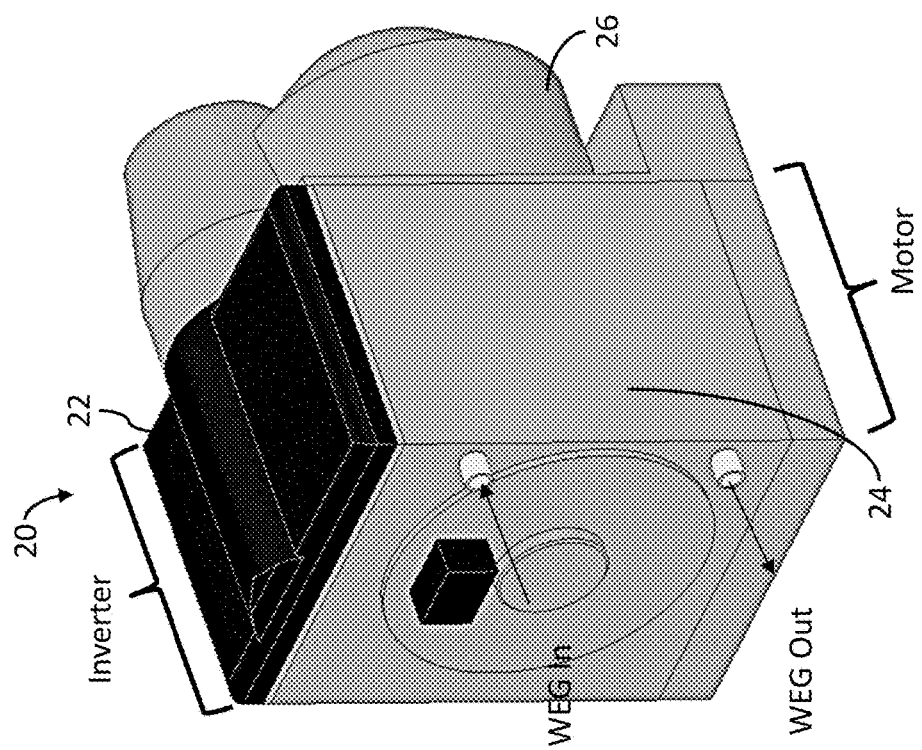
FIG. 1 is a perspective view of a power drive module.

Turning now to a discussion of the figures, FIGS. 1 and 2 provide external views of module 20. Module 20 includes a voltage source inverter assembly 22, an electric machine assembly 24 and a gearbox assembly 26. As shown in the schematic diagram of FIG. 54, inverter assembly 22 includes voltage source inverter circuitry 220 and control circuitry 222 for controlling the operation of electric machine 24. A DC voltage source 23, e.g., a vehicle battery or battery pack, is operably connected to the inverter 22.

Electric machine 24 is an internal permanent magnet electric machine in the exemplary embodiment but alternative forms of electric machines may also be employed with the present disclosure. For example, the depicted electric machine 24 is a three-phase electric machine, however, alternative embodiments might employ an electric machine having a different number of phases. Instead of an electric machine having a rotor with permanent magnets, alternative designs, such as an induction electric machine, could also be used. Similarly, while electric machine 24 shows the stator phases being connected in a star or wye configuration, electric machine 24 is not limited to this type of configuration and may alternatively employ a delta connection between the phases. A person having ordinary skill in the art will recognize that various other alternative embodiments of electric machine 24 may also be employed with module 20.

Electric machine 24 is selectively operable as either a motor to provide torque to the drive train of the vehicle, or as a generator to supply electrical current to the electrical system of the vehicle and/or recharge the battery pack of the vehicle. Inverter 22 converts DC current to AC current and supplies AC current to electric machine 24 when electric machine 24 is operating as a motor. Electric machine 24 generates electrical current when it is being operated as a generator, e.g., during regenerative braking. In the illustrated embodiment, electric machine 22 is a three phase electric machine and each of the three stator phases are connected via stator leads 104 to inverter circuitry 220. Control circuitry 222 controls the operation of circuitry 220 via control signal lines 224 when operating electric machine 24.

In the illustrated embodiment, inverter circuitry includes a high side switch and diode and a low side switch and diode for each phase of the electric machine. The switches may take the form of field effect transistors (FETs), insulated-gate bipolar transistors (IGBTs) an an alternative switch mechanism such as bipolar junction transistors, e.g., an NPN or PNP transistor. The switches are controlled by control circuitry 222, which may take the form of a processor, with electrical lines 224 conveying pulse width modulation (PWM) signals to the individual switches to thereby control the operation of the switches. Other variants of inverter circuitry and control known to those having ordinary skill in the art may also be used.

Inverter circuitry 220 and control circuitry 222 are mounted on base plate 50 which absorbs heat from the circuitry 220, 222. In the illustrated embodiment base plate 50 is a cast aluminum housing member and includes a set of heat exchanging surfaces in the form of fins 52 located opposite circuitry 220, 222 whereby heat generated by circuitry 220, 222 can be transferred to the WEG through housing member 50 as further discussed below.

In the illustrated embodiment, control circuitry 222 is also connected to a vehicle electronic control unit ("ECU") 230 via electrical signal/data communication line 226 whereby ECU 230 may coordinate the operation of module 20 with other vehicle functions.

Gearbox assembly 26 includes a gear assembly which couples electric machine 24 to an output shaft 28. Output shaft 28 is, in turn, coupled with the drive system of the vehicle whereby output shaft 28 can contribute torque to the drive system 29 when electric machine 24 is operated as a motor and can be driven by the drive system to supply torque to electric machine 24 when electric machine 24 is operated as a generator. It is noted that the figures refer to electric machine 24 as only a motor but this does not imply that electric machine 24 can only be operated as a motor.

Figure 51:
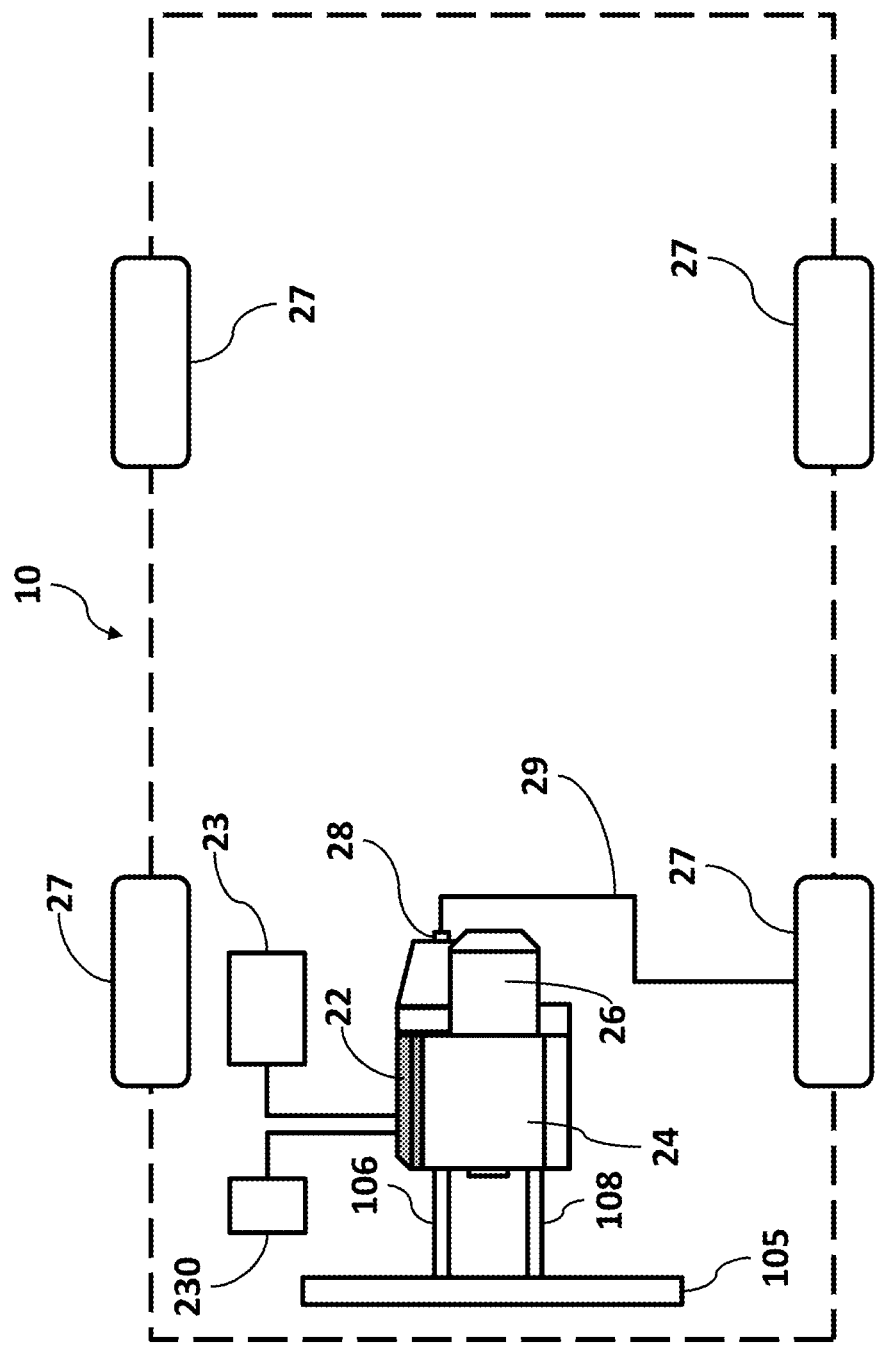
FIG. 51 is a schematic depiction of a vehicle employing a power drive module.

FIG. 51 provides a schematic depiction of how module 20 may be integrated into a vehicle 10. In this example, vehicle 10 includes wheels 27 and shaft 28 is coupled to the drive system 29 of vehicle 10 which drives one or more of the wheels 27 as schematically depicted by FIG. 51. Vehicle 10 also includes a heat exchanger 105 in the form of a conventional radiator which cools the WEG coolant circulated through module 20. The WEG coolant cooled by radiator 105 may also be used to cool other vehicle components not depicted in FIG. 51.

Figure 3:
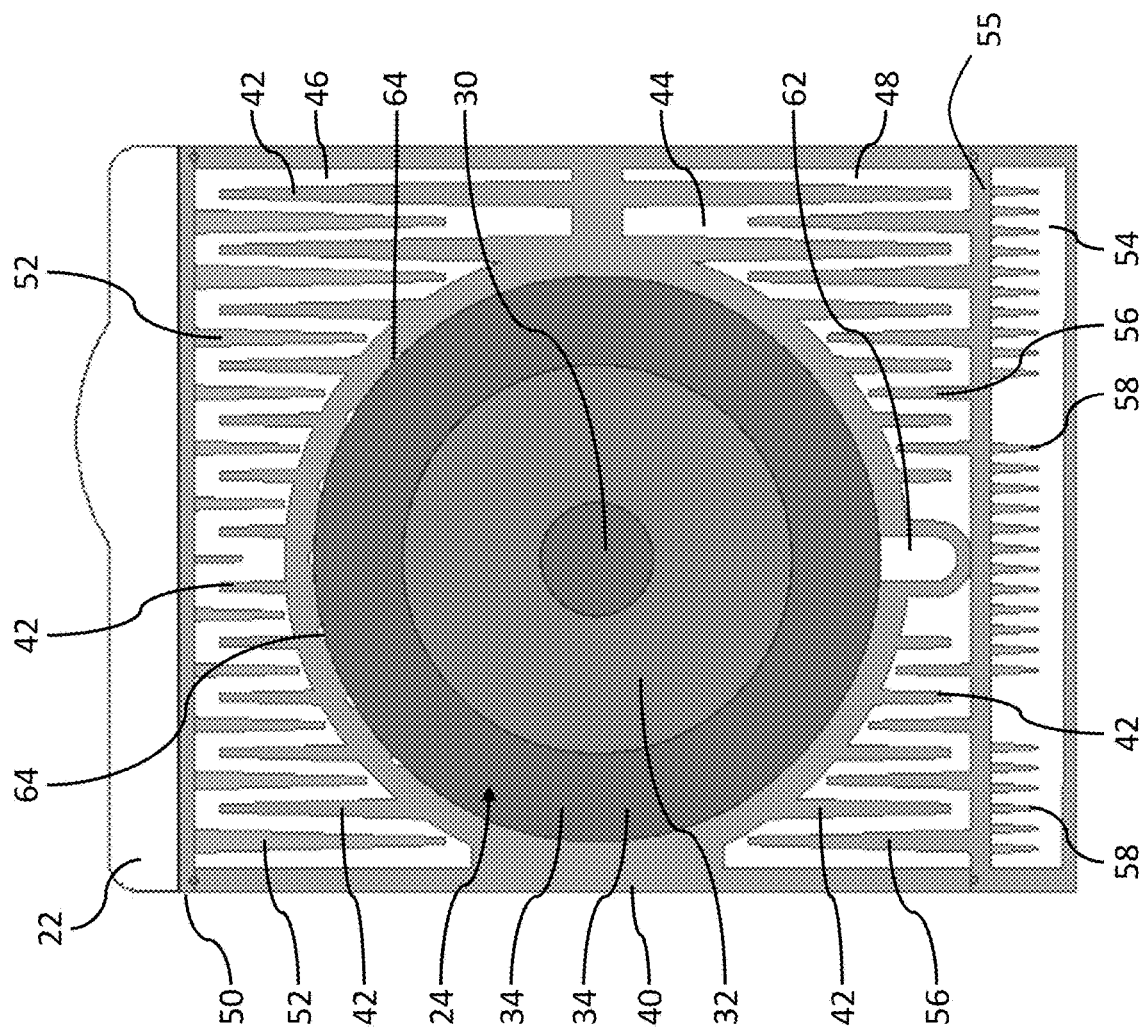
FIG. 3 is a schematic cross sectional view of the power drive module.
Figure 5:
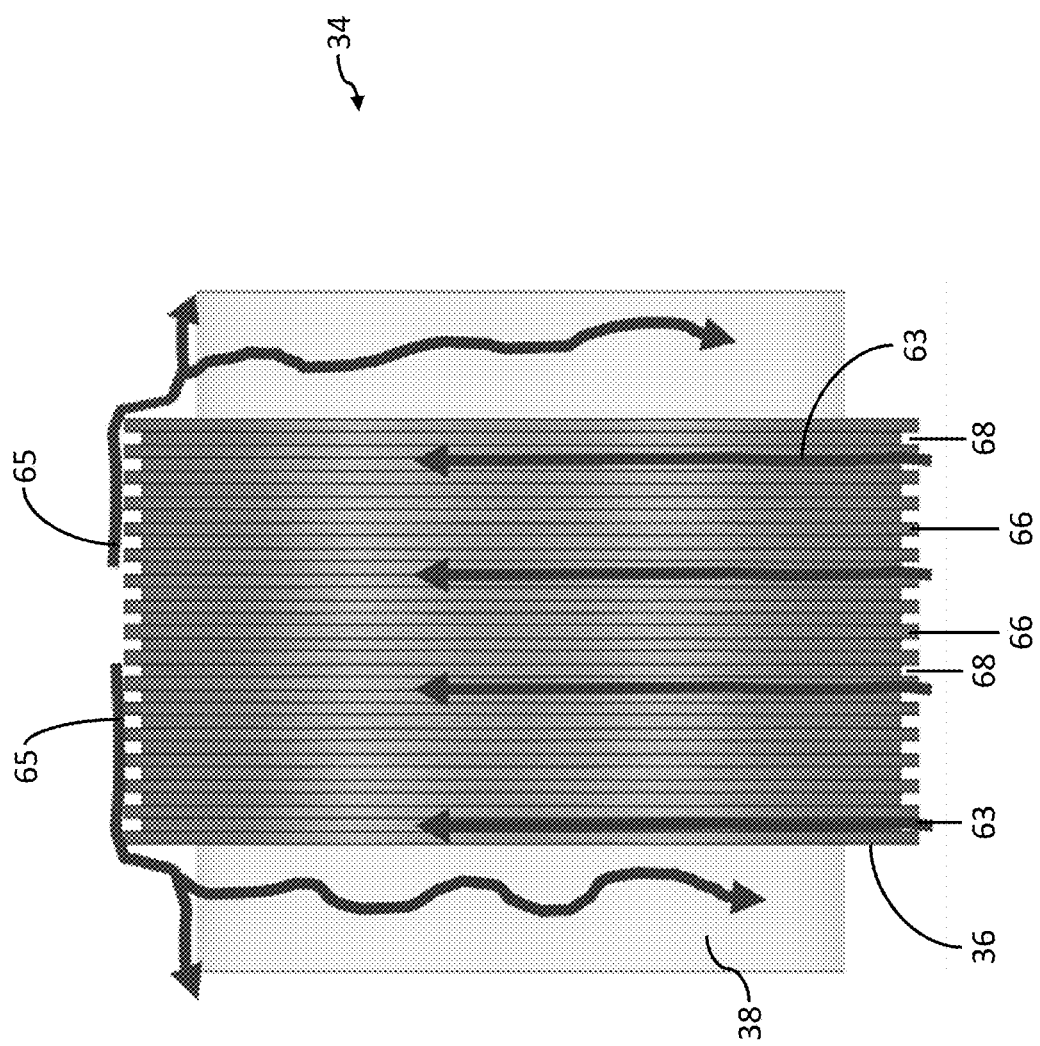
FIG. 5 is a side view of the electric machine which has a finned stator core.

FIG. 3 provides a cross sectional view of module 20 perpendicular to rotor shaft 30 of electric machine 24. Mounted on shaft 30 is the rotor 32 of electric machine 24 and surrounding rotor 32 is stator 34. As can be seen in FIG. 5, stator 34 includes a stator core 36 and windings 38 which project from the axial ends of stator core 36 to form end loops. Stator 34 is mounted within housing member 40. Housing member 40 surrounds and firmly engages the radially outer surface of stator core 36 to thereby mount stator 34 in housing member 40 and thermally couple housing member 40 with stator 34. The inward facing surfaces of housing member 40 define cooling oil passages used to circulate cooling oil to cool electric machine 24 as discussed further below. The outward facing surfaces of housing member 40 define a set of heat exchanging surfaces in the form of fins 42. Fins 42 project into an interior space 44 of the electric machine housing through which a liquid WEG coolant is circulated to thereby provide an integral heat exchanger.

The interior space 44 of this integral heat exchanger includes an upper chamber 46 and a lower chamber 48. Fins 42 projecting from housing member 40 project into both the upper and lower chambers 46, 48 of this integral heat exchanger. A housing member 50 that is thermally coupled to and forms the base plate of inverter 22 and functions as a heat sink for the inverter and control circuitry mounted thereon. Fins 52 are integrally formed with base plate 50 and project into upper chamber 46 of the interior volume of the integral heat exchanger. Thus, coolant circulating through upper chamber 46 removes heat from both fins 42 and 52 and thereby simultaneously cools both the inverter assembly 22 and the electric machine 24.

Figure 4:
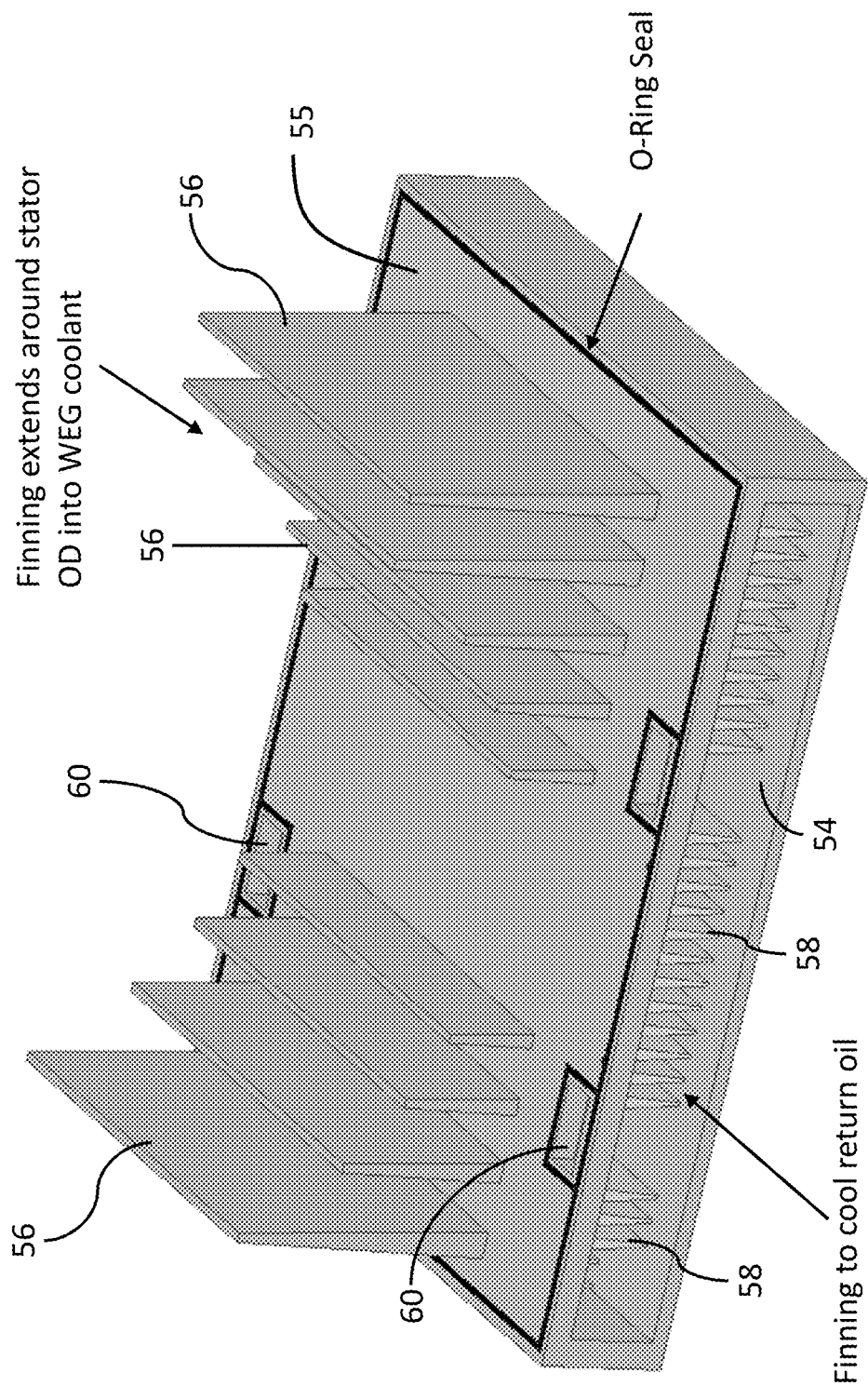
FIG. 4 is a perspective view of a housing member that forms a lower oil sump.

A lower sump 54 is provided to collect oil circulated about electric machine 24 and can be seen in both FIGS. 3 and 4. The lower sump housing shown in FIG. 4 may be formed out of a single integral casting or several components. Advantageously, a single integral housing member is used to form the top wall of the lower sump 54 from which a set of heat exchange surfaces such as fins 56 project into lower chamber 48 and from which another set of heat exchange surfaces such as fins 58 project into lower sump 54. Four openings 60 provide channels for the oil to return to lower sump 54.

An oil pump, further discussed below, is used to pump oil into the lower distribution channel 62 formed by housing member 40. This oil is then forced upwards, as indicated by arrows 63 in FIG. 5 along the radially outer surface of stator core 36 whereby the oil removes heat from the stator core. At the upper edge of the stator core 36, the oil moves into grooves 64 formed in housing 40 to thereby flow to the axial ends of the stator core 36 where the oil flows downward contacting the end loops of the stator windings 38 as indicated by arrows 65 in FIG. 5. As best understood with reference to FIG. 5, stator core 36 is formed out of a plurality of stacked laminations, in the exemplary embodiment, these laminations have two different diameters such that the larger diameter laminations form heat exchange surfaces in the form of fins 66 projecting radially outwardly from stator core 36. The individual fins may be formed out of a single lamination or out of a plurality of laminations. For example, five or some other number of large laminations can be stacked consecutively to form a fin 66 and then five or some other number of smaller diameter laminations can be stacked to form a groove 68 between the fins 66. The oil is forced upward along grooves 68 between fins 66 as indicated by arrows 63. (It is noted that stator core 36 is also referred to in the text of the figures as the stator iron.)

Figure 6:
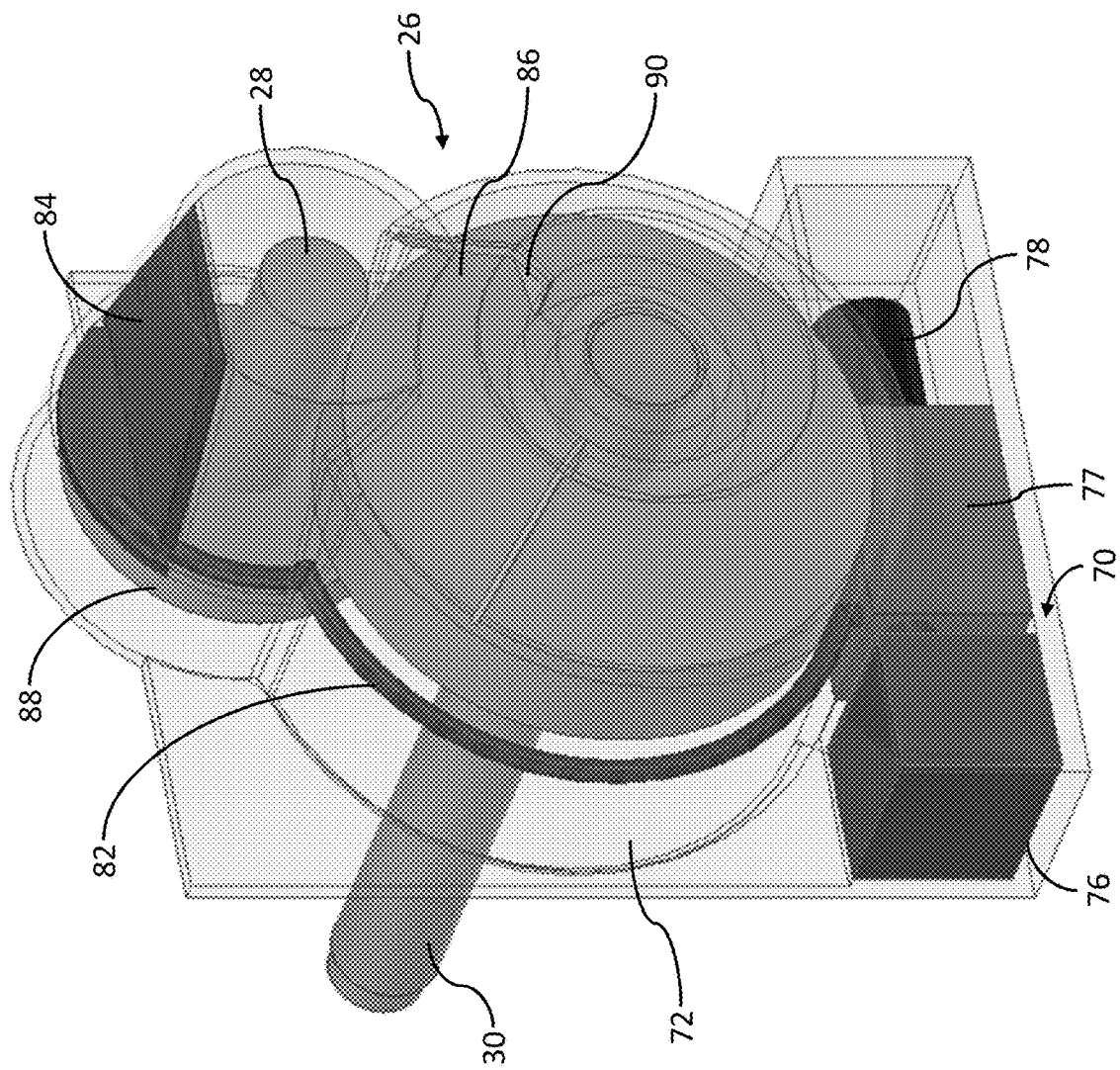
FIG. 6 is a partial schematic view of the gearbox and oil pump assembly.
Figure 10:
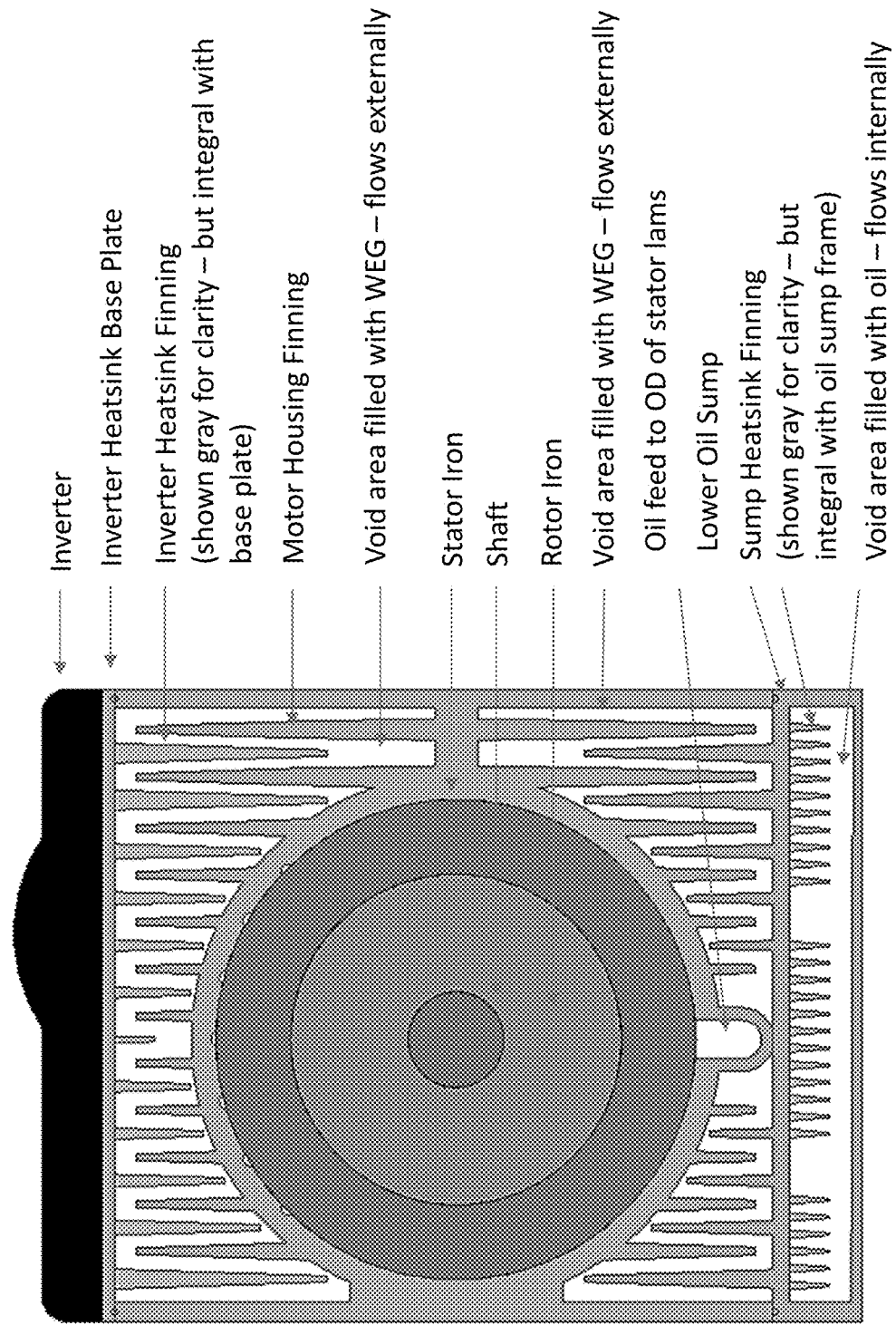
FIG. 10 is a schematic cross sectional view of the power drive module.

FIG. 6 illustrates the gearbox assembly 26 and oil pump assembly 70. FIG. 6 depicts gearbox housing 72 as translucent for purposes of graphical clarity. Housing member 72, similar to the other housing members of the exemplary embodiment, is formed out of cast metal material, e.g., aluminum. Various other methods and materials for forming some or all of the housing members may alternatively be employed.

Figure 18:
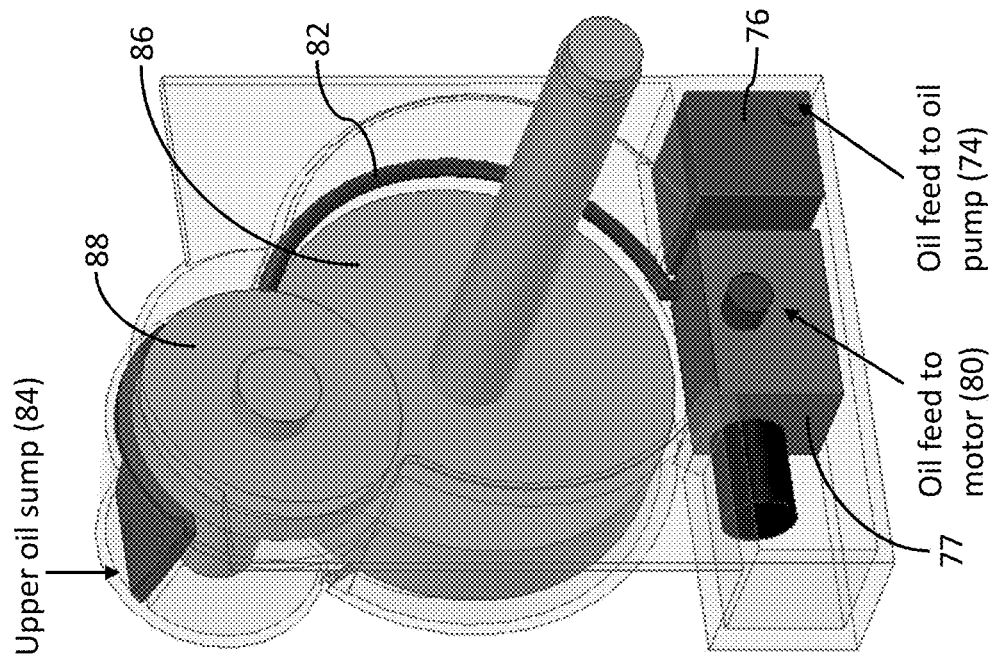
FIG. 18 is another perspective view of the gearbox and oil pump assembly.
Figure 17:
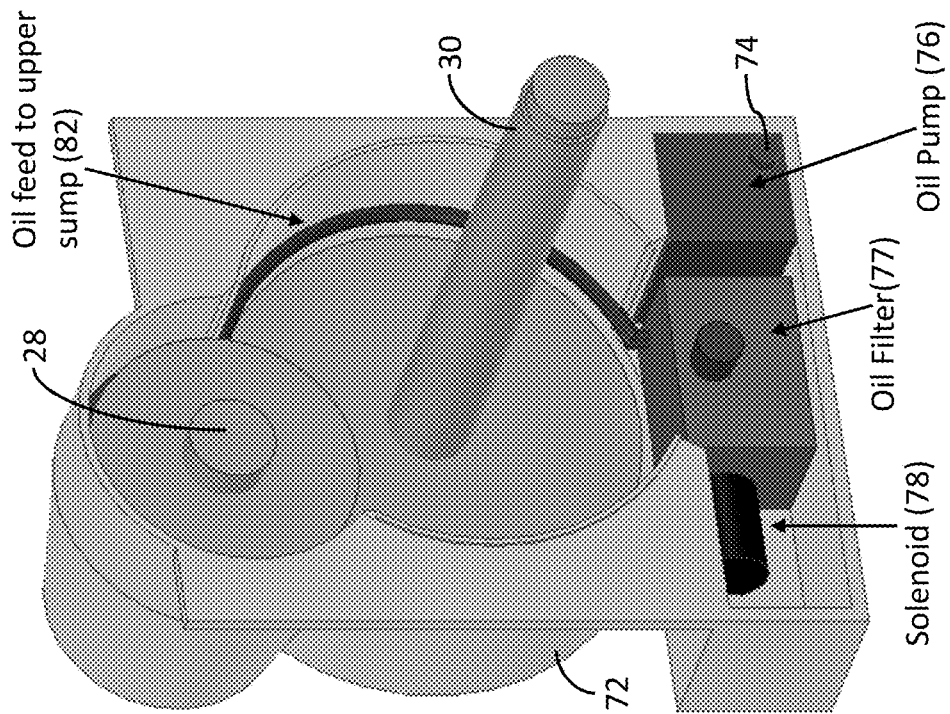
FIG. 17 is a perspective view of the gearbox and oil pump assembly.
Figure 19:
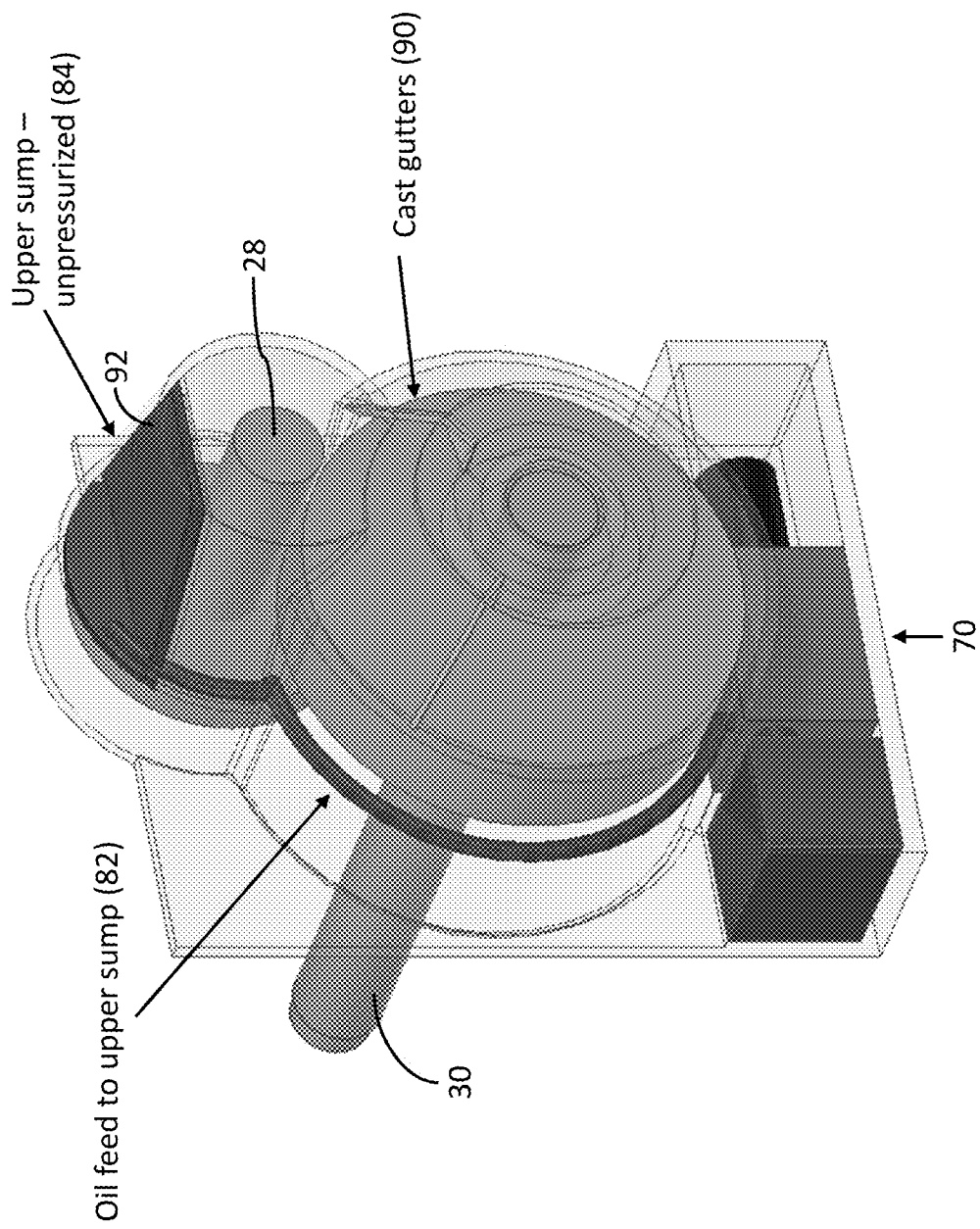
FIG. 19 is another perspective view of the gearbox and oil pump assembly showing a gutter cast into the housing that directs oil onto a bearing from the unpressurized upper oil sump.
Figure 20:
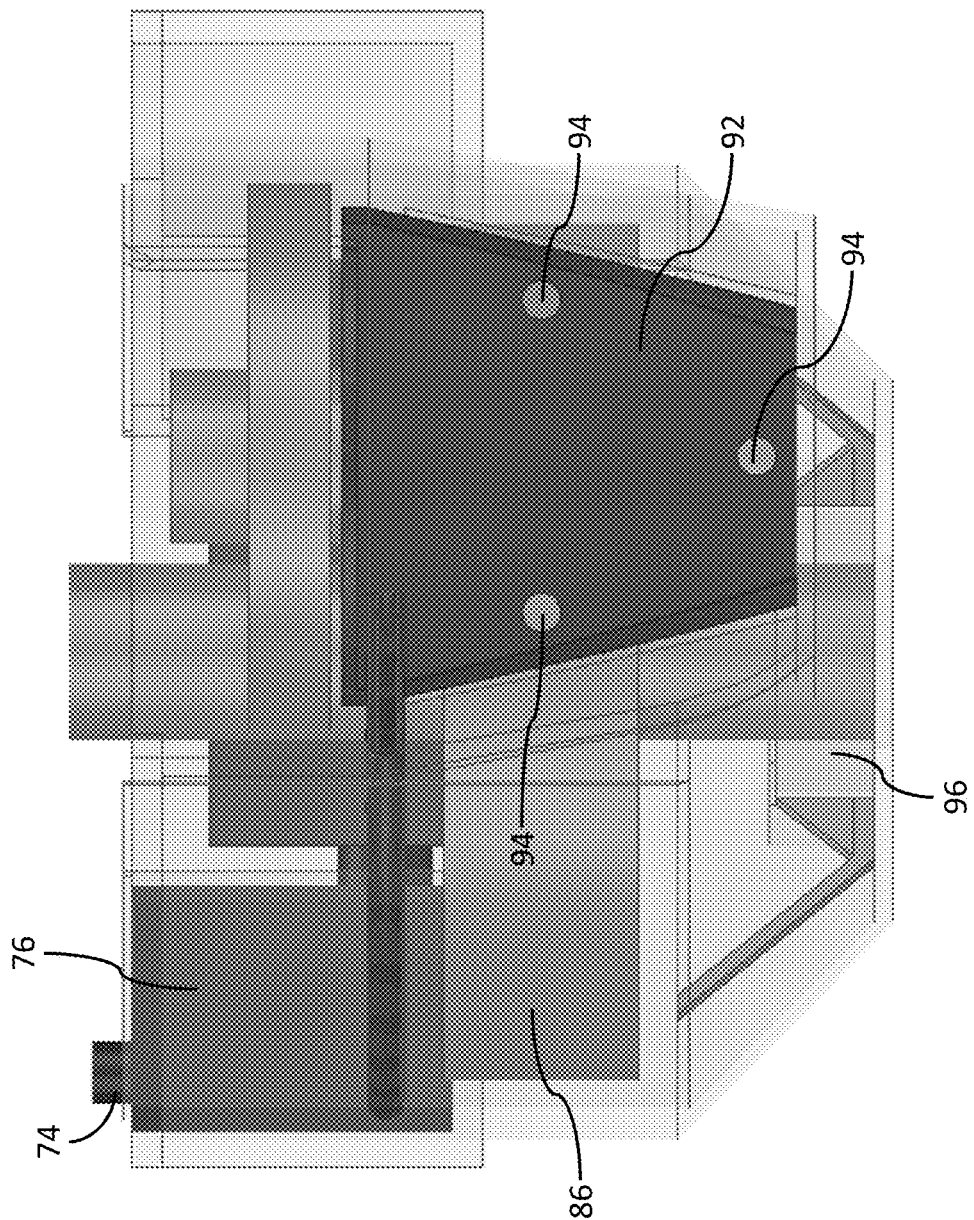
FIG. 20 is a top view of the gearbox showing openings in the upper oil sump for directing oil onto selected areas within the gearbox.

As best seen in FIGS. 17 and 18, oil pump 76 receives oil from lower oil sump 54 through oil intake channel 74. The oil discharged from pump 76 is received by oil filter 77 which filters the oil before it is fed to either the electric machine housing or gearbox housing. A solenoid actuated valve assembly 78 receives the filtered oil and divides the flow into two separate flows, i.e., a flow channel 80 leading to distribution channel 62 of electric machine housing 40, and a supply tube 82 leading to an elevated oil sump 84.

Oil pump 76 is a variable capacity oil pump that is controlled by control circuitry located in inverter assembly 22. The ability to vary the capacity of oil pump 76 together with the ability to alter the relative proportion of the discharged oil flow directed to distribution channel 62 and upper oil sump 84 provided by solenoid actuated valve assembly 78 allows the oil flow to the distribution channel 62 and upper oil sump 84 to be independently controlled and adjusted to meet the specific requirements required by the current operational status of the drive module. This contrasts beneficially and is more efficient than an oil pump that is sized and continually operated to satisfy the highest demands on the oil pump. It is also more efficient than a gearbox cooling and lubrication system that employs a lower oil sump that is distributed by having the gears continuously agitate and splash the oil to distribute throughout the gearbox.

Returning to FIG. 6, gear 86 is mounted on an extended length of rotor shaft 30 and meshes with gear 88 mounted on output shaft 28. It is noted that gears 86, 88 are shown in simplified form in the figures without showing the individual gear teeth of the gears which mesh together to thereby operably couple the gears together. Due to the operation of gears 86, 88, output shaft 28 will rotate at a higher rotational speed than rotor shaft 30.

Figure 43:
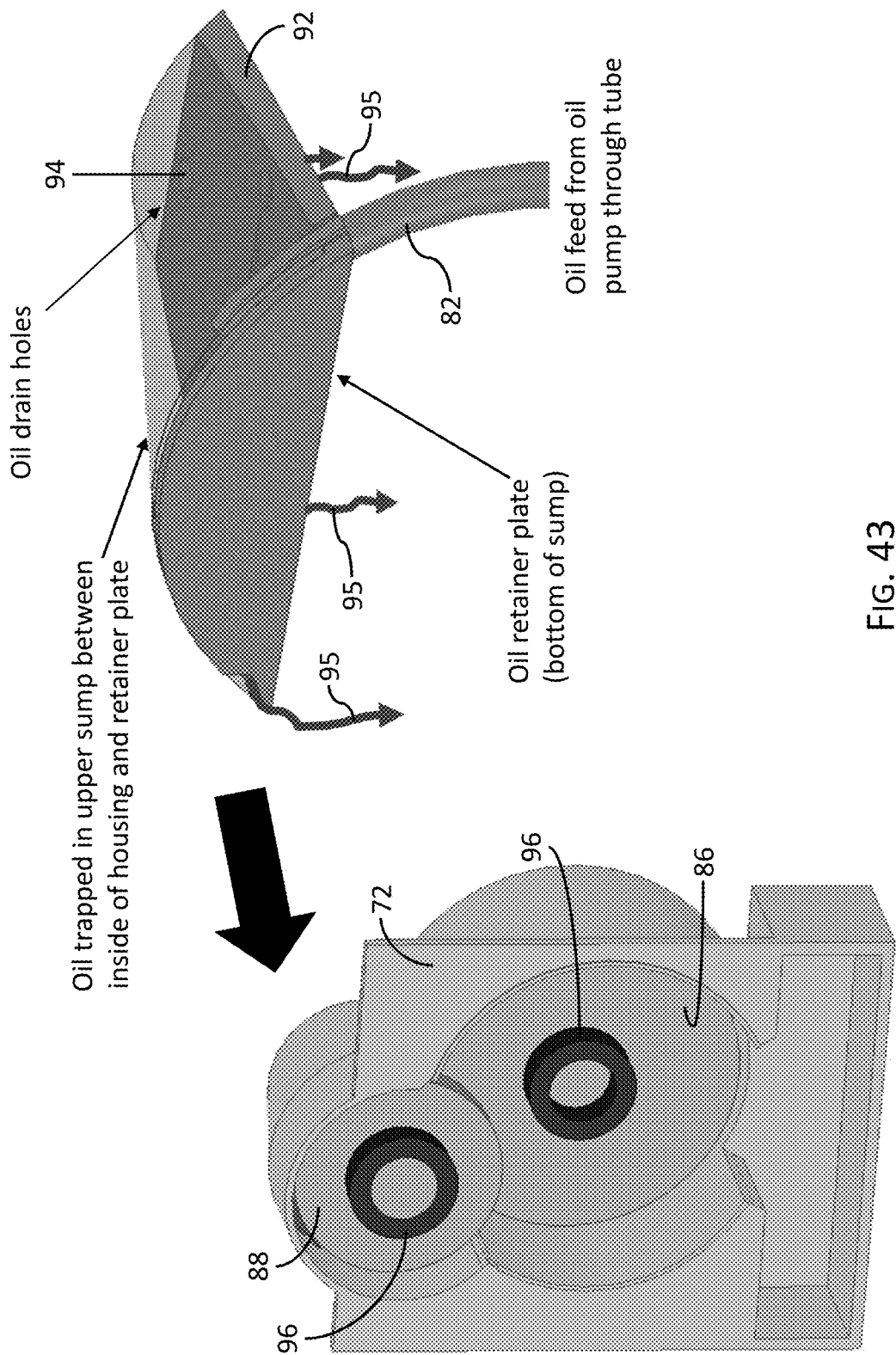
FIG. 43 is perspective view of the gearbox housing and a detail view of the upper oil sump.
Figures 44, 45:
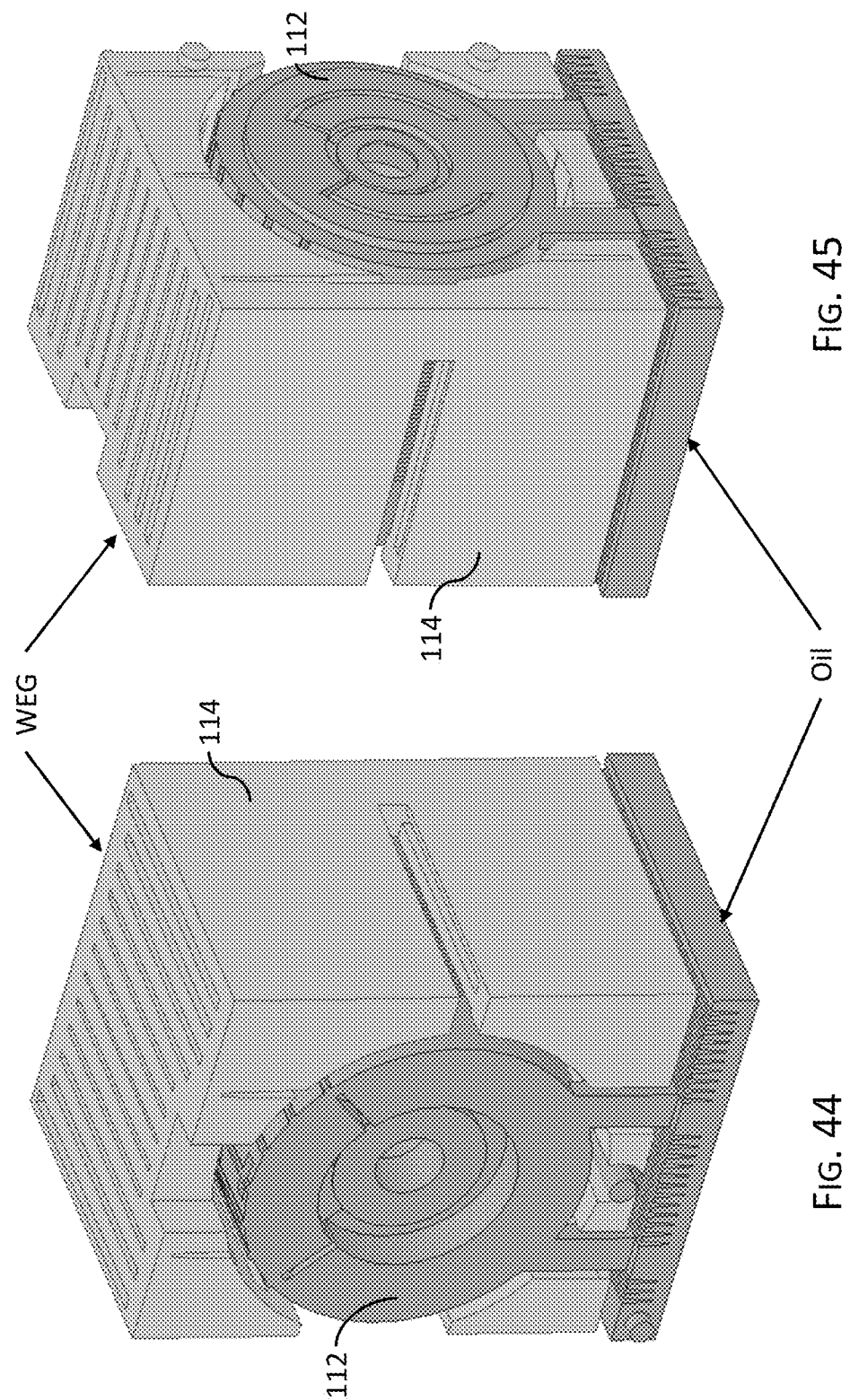
FIG. 44 is a perspective view showing the volumes for circulating the WEG coolant and the oil.
FIG. 45 is another perspective view showing the volumes for circulating the WEG coolant and the oil.
Figure 47:
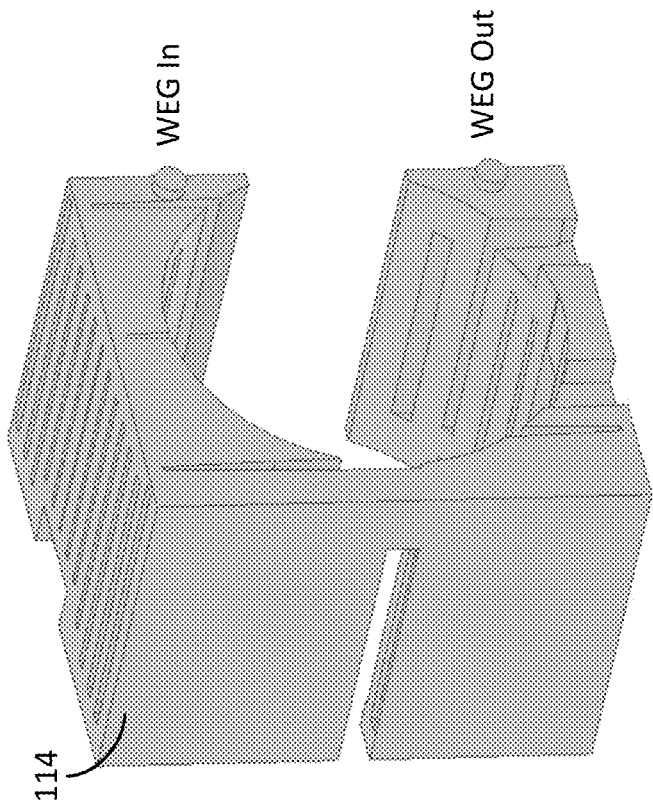
FIG. 47 is a perspective view showing the volume occupied by the WEG coolant.
Figure 46:
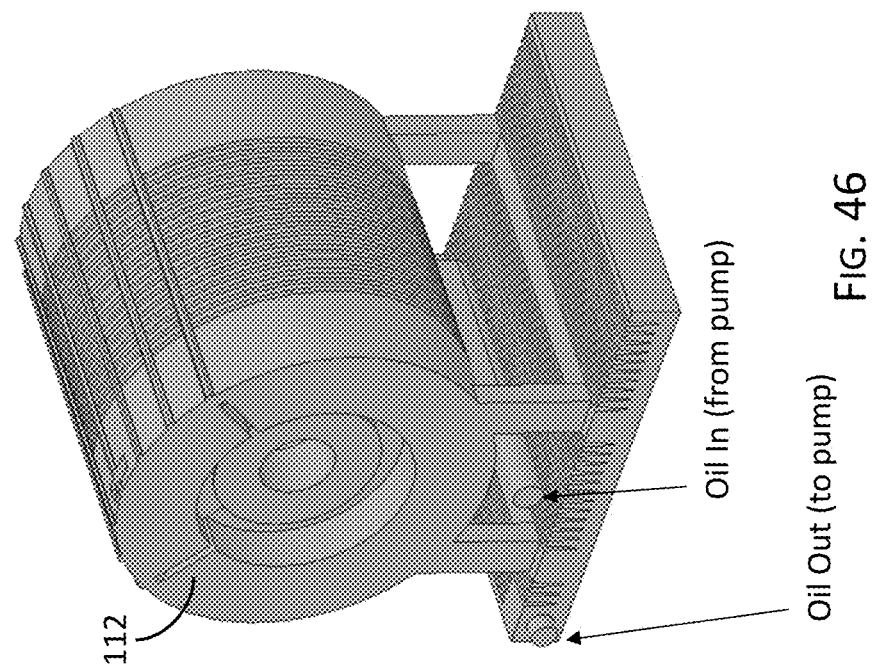
FIG. 46 is a perspective view showing the volume through which oil is circulated.

The operation of upper oil sump 84 is best understood with reference to FIGS. 6, 19, 20 and 43. As mentioned above, oil pump 76 supplies oil to upper sump 84 via supply line 82. A partition member 92, also called a retainer plate in the figures, is mounted in the upper portion of gearbox housing 72 to form elevated oil sump 84. Unlike distribution channel 62 which is pressurized, elevated oil sump 84 is unpressurized. Partition member 92 includes openings 94 to allow oil in sump 84 to be gravity fed from sump 84 onto selected surfaces of the gearbox assembly such as gear members 86, 88 and bearings 96 which rotationally support shafts 28, 30. Openings 94 may be positioned directly above the surfaces that receive the oil or gutters 90 or similar routing structures may be used to direct the oil onto the surfaces for which the application of oil is desired. Oil may also be dispersed from oil sump 84 through gaps between partition member 92 and housing 72. Arrows 95 in FIG. 43 schematically depict the gravity fed oil flow from oil sump 84.

Figure 11:
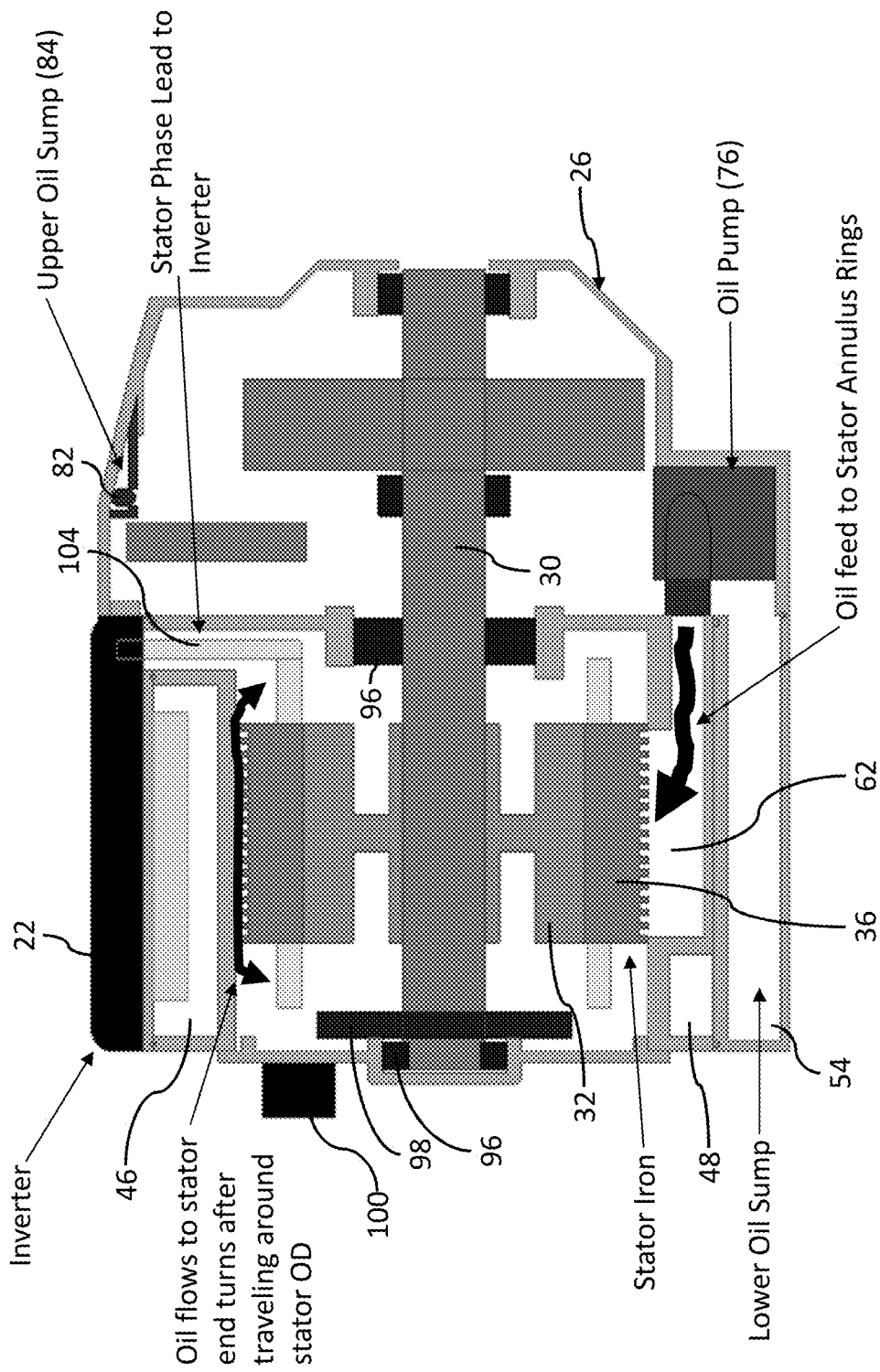
FIG. 11 is another schematic cross sectional view of the power drive module.
Figure 12:
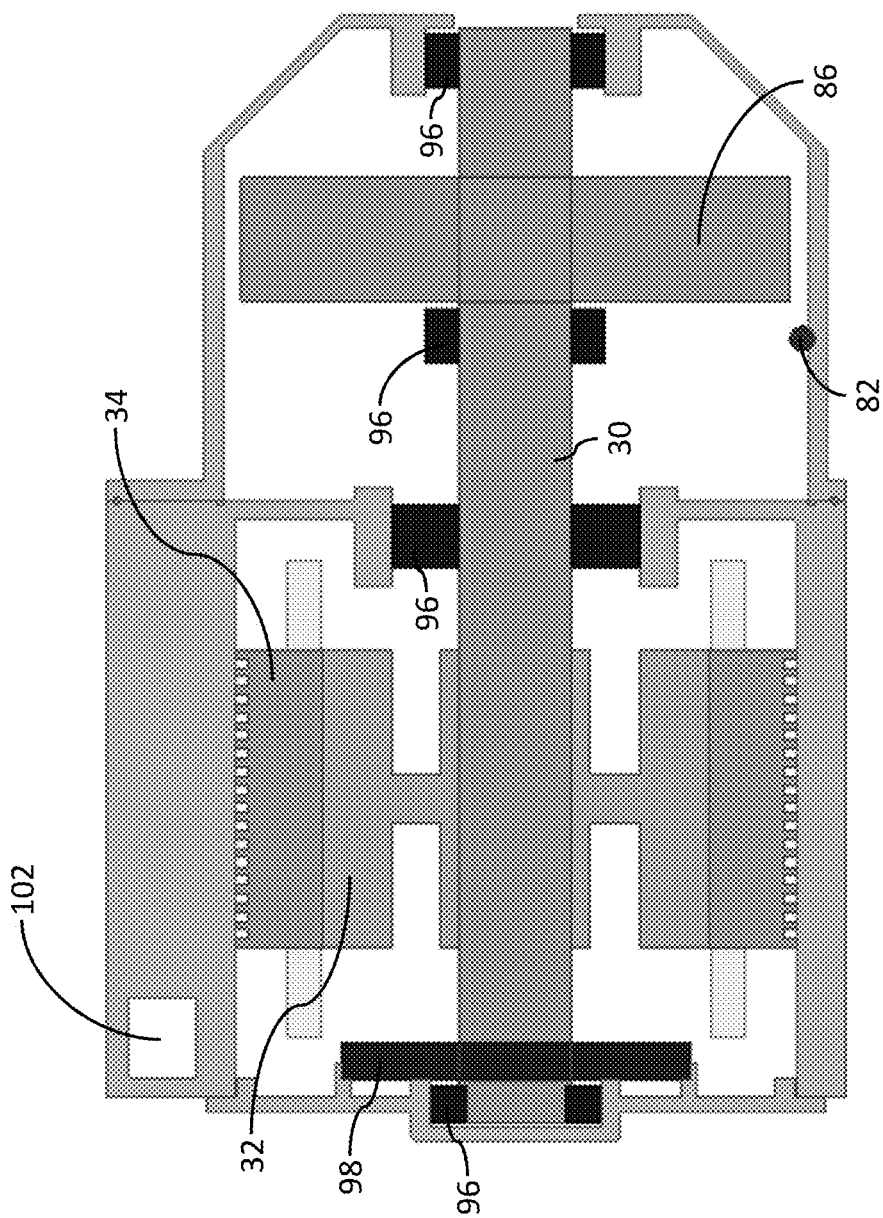
FIG. 12 is another schematic cross sectional view of the power drive module.

FIGS. 11 and 12 provide cross sectional views of module 20. FIG. 11 depicts a cross sectional view along a vertically oriented plane through the rotational axis of rotor shaft 30. As can be seen in FIG. 11, stator leads 104 extend from stator windings 38 to the inverter assembly 22 to thereby operably couple the voltage source inverter with electric machine 24.

Also depicted in FIG. 11 is a resolver 98 which senses the rotational position of rotor shaft 30 and can be used to determine the rotational speed and/or rotational position of shaft 30 and rotor 32 mounted thereon. Signal lines (not shown) connect resolver 98 with connector 100 located on the exterior of the housing. Connector 100 allows a cable to be connected thereto to communicate the signals generated by resolver 98 to control circuitry within inverter assembly 22 and other control and sensing circuitry of the vehicle, e.g., ECU 230. FIG. 12 is a cross sectional view of module 20 along a horizontal plane through the rotational axis of shaft 30. Passage 102 which connects the upper chamber 46 and lower chamber 48 of the heat exchanger is visible in this view.

Figure 13:
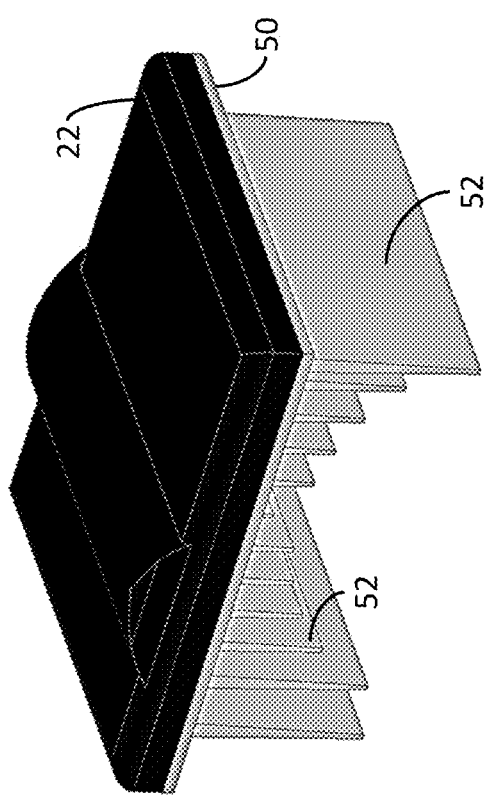
FIG. 13 is a perspective view of the inverter and the inverter base plate.
Figure 14:
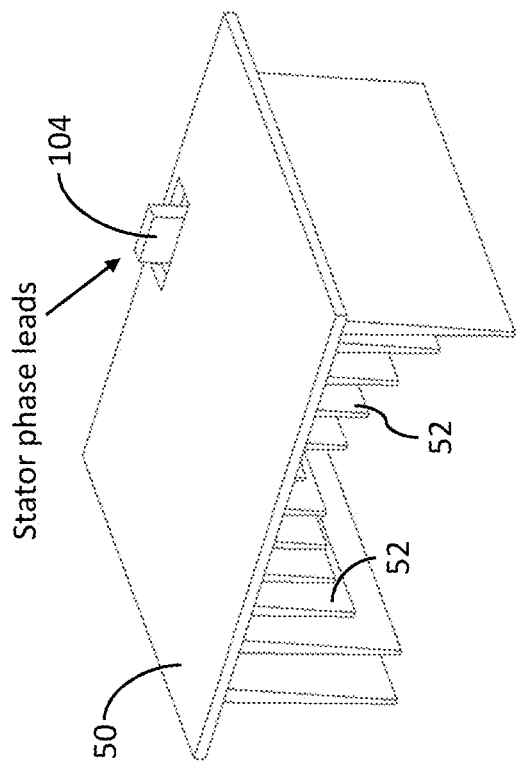
FIG. 14 is a perspective view of the inverter base plate and stator phase leads which connect to the inverter.
Figure 15:
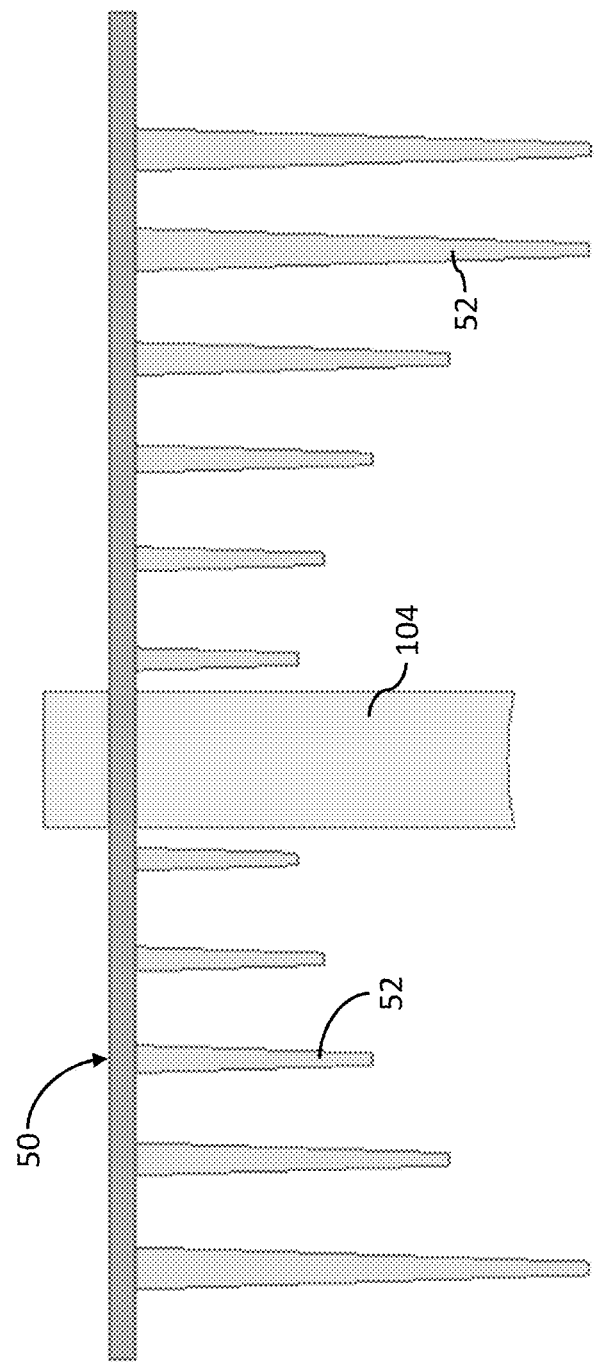
FIG. 15 is an end view of the inverter base plate and stator phase leads.

Inverter assembly 22 is shown in FIGS. 13-15. As mentioned above, the inverter and control circuitry are mounted on a cast aluminum base plate 50 that has integrally cast fins 52 extending therefrom. Fins 52 project into upper chamber 46 where they are cooled by WEG coolant circulated through the electric machine housing. Stator leads 104 (schematically depicted in FIGS. 14 and 15) extend through an opening in baseplate 50 and are connected with the voltage source inverter circuitry. The opening through which stator leads 104 project is sealed to prevent the migration of oil therethrough.

Figure 16:
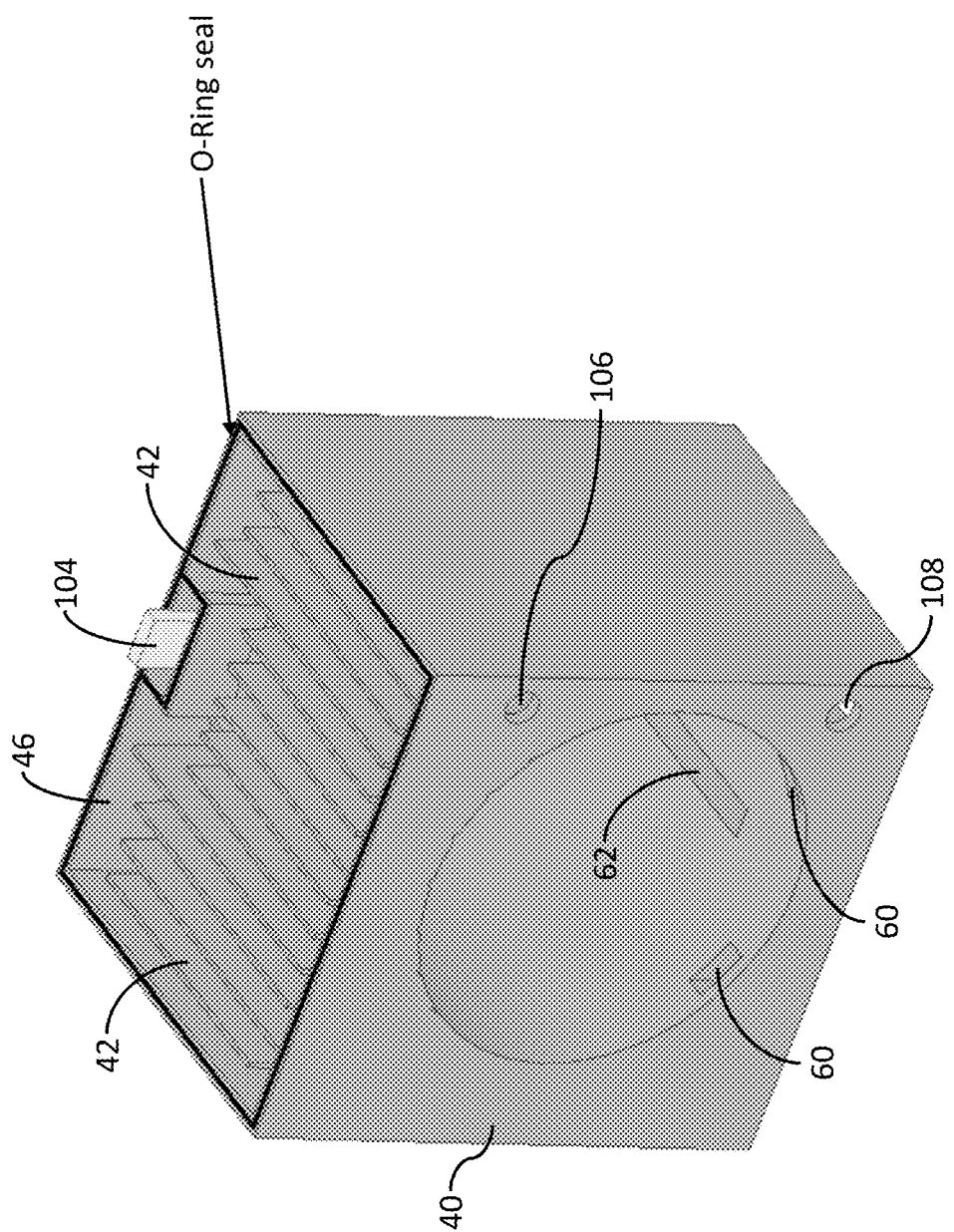
FIG. 16 is a perspective view of the electric machine housing with the inverter plate removed.
Figure 21:
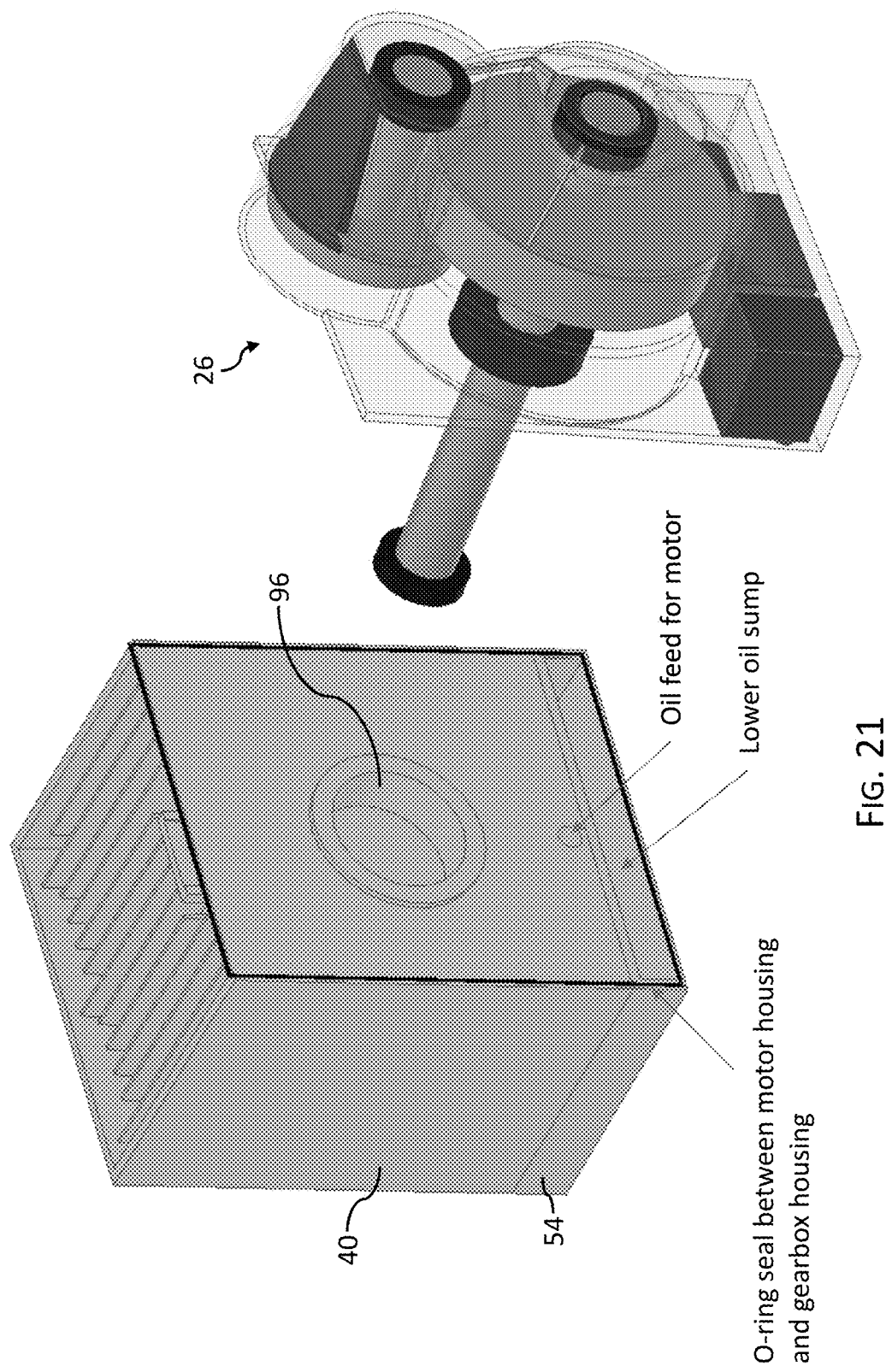
FIG. 21 is an exploded perspective view of the electric machine housing and gearbox assembly.

Electric machine housing 40 is formed out of cast aluminum in the exemplary embodiment and can be seen in FIGS. 16, 21, 24, 25, 41 and 42 as well as other figures. FIG. 16 provides a perspective view of housing 40 with baseplate 50 removed. Two of the return openings 60 through which oil returns to lower sump 54 and distribution channel 62 can be seen in FIG. 16. O-ring seals are used at junctions between housing members where sealing the joint is necessary and such seals may be seated in a groove located in the housing. FIGS. 41 and 42 provide multiple views of housing 40 and also show rear cover 41 detached from the remainder of housing 40. FIGS. 24 and 25 illustrate housing 40 with electric machine 24 installed therein. FIG. 21 provides a perspective view which shows the relationship between the electric machine and housing and the gearbox assembly and its housing. FIG. 21 also shows the lower sump 54 attached to housing 40.

Figure 23:
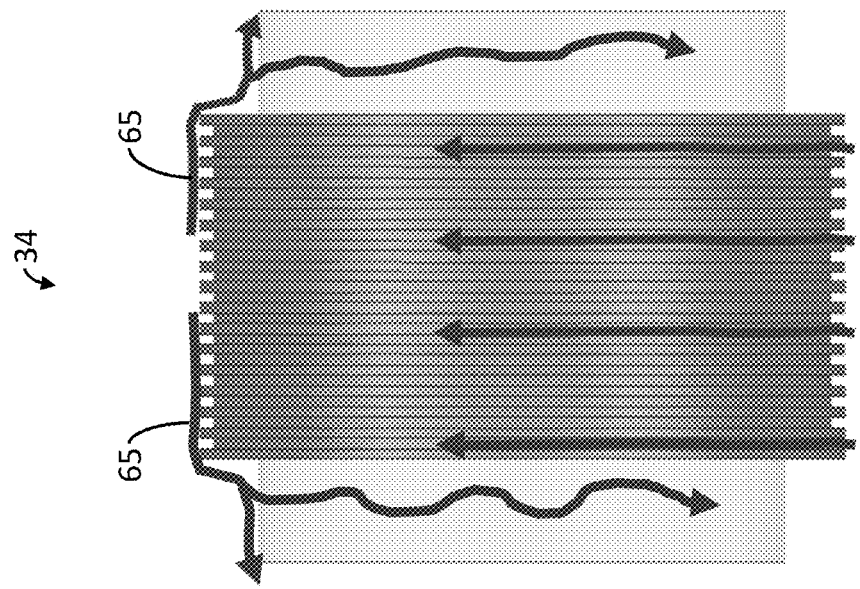
FIG. 23 is a side view of the electric machine stator showing the oil circulation pattern.
Figure 22:
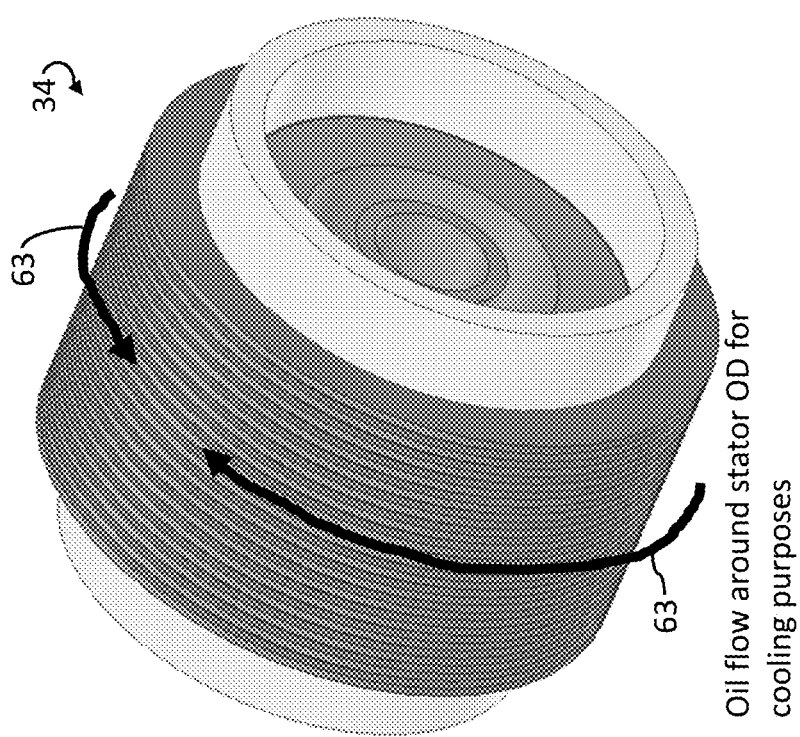
FIG. 22 is a perspective view of the electric machine stator showing the oil circulation pattern.
Figure 26:
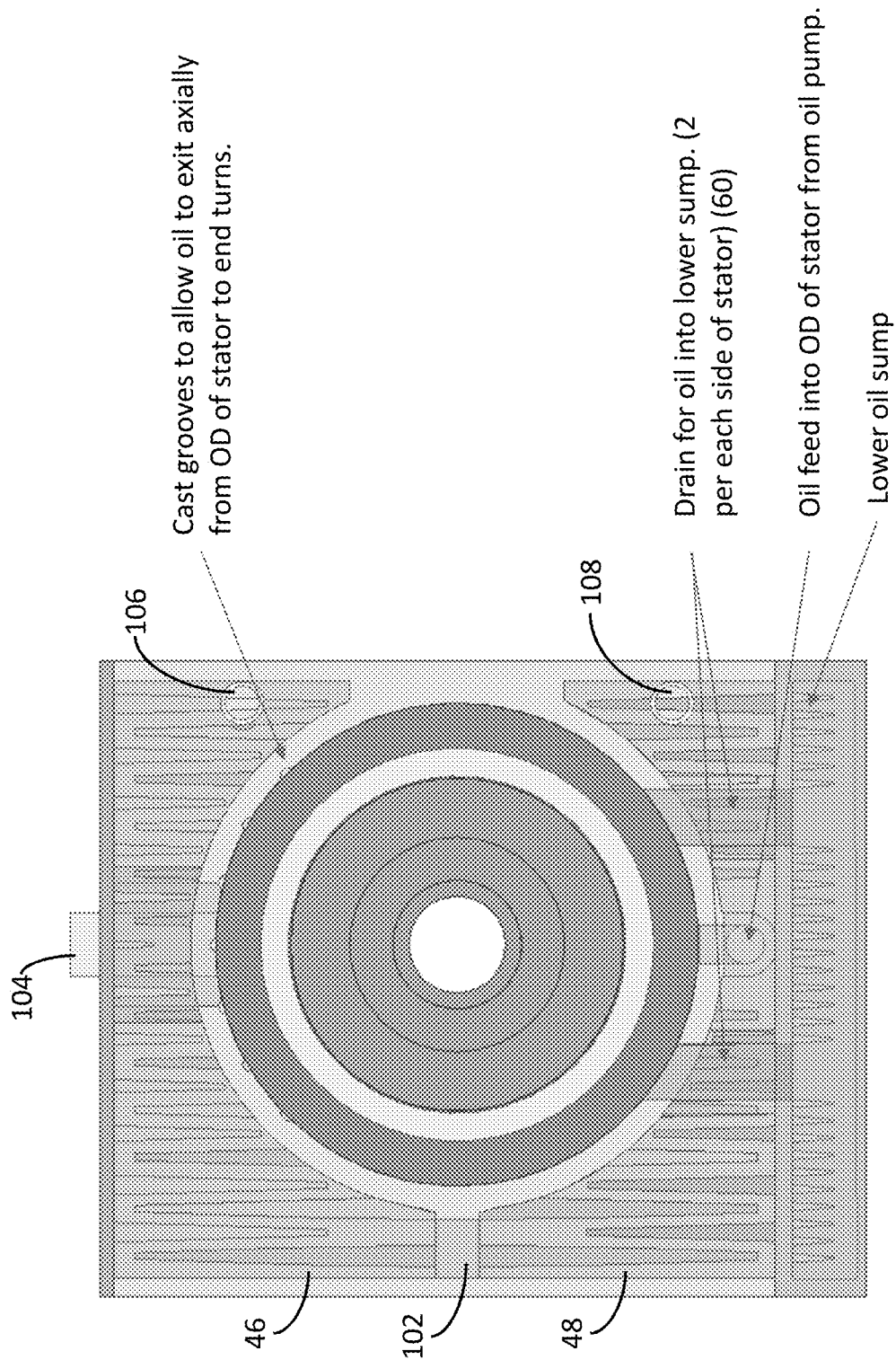
FIG. 26 is a cross sectional view of the electric machine housing.

The use of oil to cool electric machine 24 and lubricate bearings 96 within housing 40 is now discussed with reference to FIGS. 22, 23 and 27-30. FIG. 23 shows how the oil is pumped upward and outward relative to stator 36. This allows the oil to absorb heat from the stator core 36 and the end loops of the stator windings 38 as it drips down the end loops. The heat is then transferred from the oil to the WEG coolant through fins 56 and 58 on the lower sump 54. Housing 40 also directly transfers heat from stator core 36 to the WEG coolant through fins 42. A small amount of heat may also be transferred from electric machine 24 to the WEG coolant through other avenues. The oil distributed within housing 40 also lubricates the bearings 96 disposed within this space and cools such bearings. This arrangement, i.e., using open bearings 96 which are lubricated and cooled by the circulating oil, is more efficient than using sealed bearings packed with grease.

Because the WEG coolant absorbs heat from electric machine 24 through housing 40 without such heat being transferred through the oil, when electric machine 24 is operated at relatively low loads, the transfer of heat to the WEG coolant directly through housing 40 will be sufficient to maintain electric machine 24 at an acceptable temperature and it will not be necessary to circulate oil through housing 40 to cool electric machine 24. If open bearings are employed, however, a small quantity of oil may need to be circulated for lubrication purposes.

Figure 27:
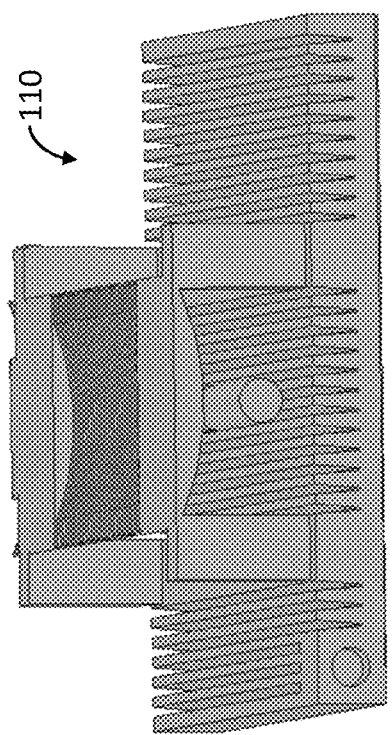
FIG. 27 is a perspective view showing the oil volume when the oil pump is not operating.
Figure 28:
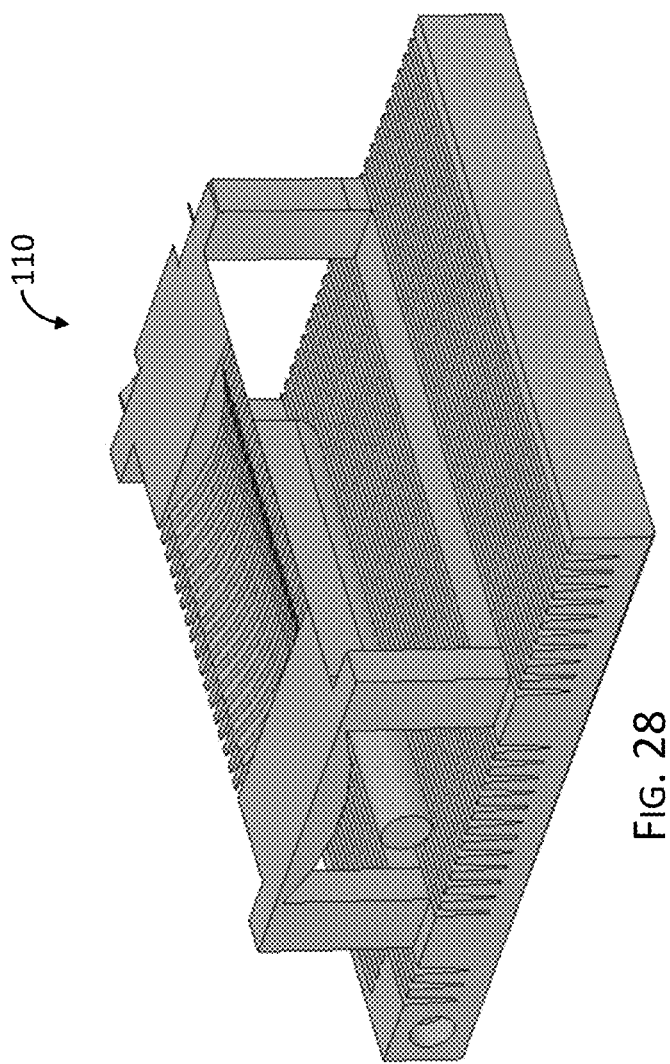
FIG. 28 is another perspective view showing the oil volume when the oil pump is not operating.

When the oil is not being actively circulated through housing 40 by the oil pump, the oil will settle in lower portion of the interior space defined by housing 40. FIGS. 27 and 28 illustrate the volume 110 within housing 40 that will be occupied by the oil when the oil pump is not actively circulating the oil within housing 40.

Figure 29:
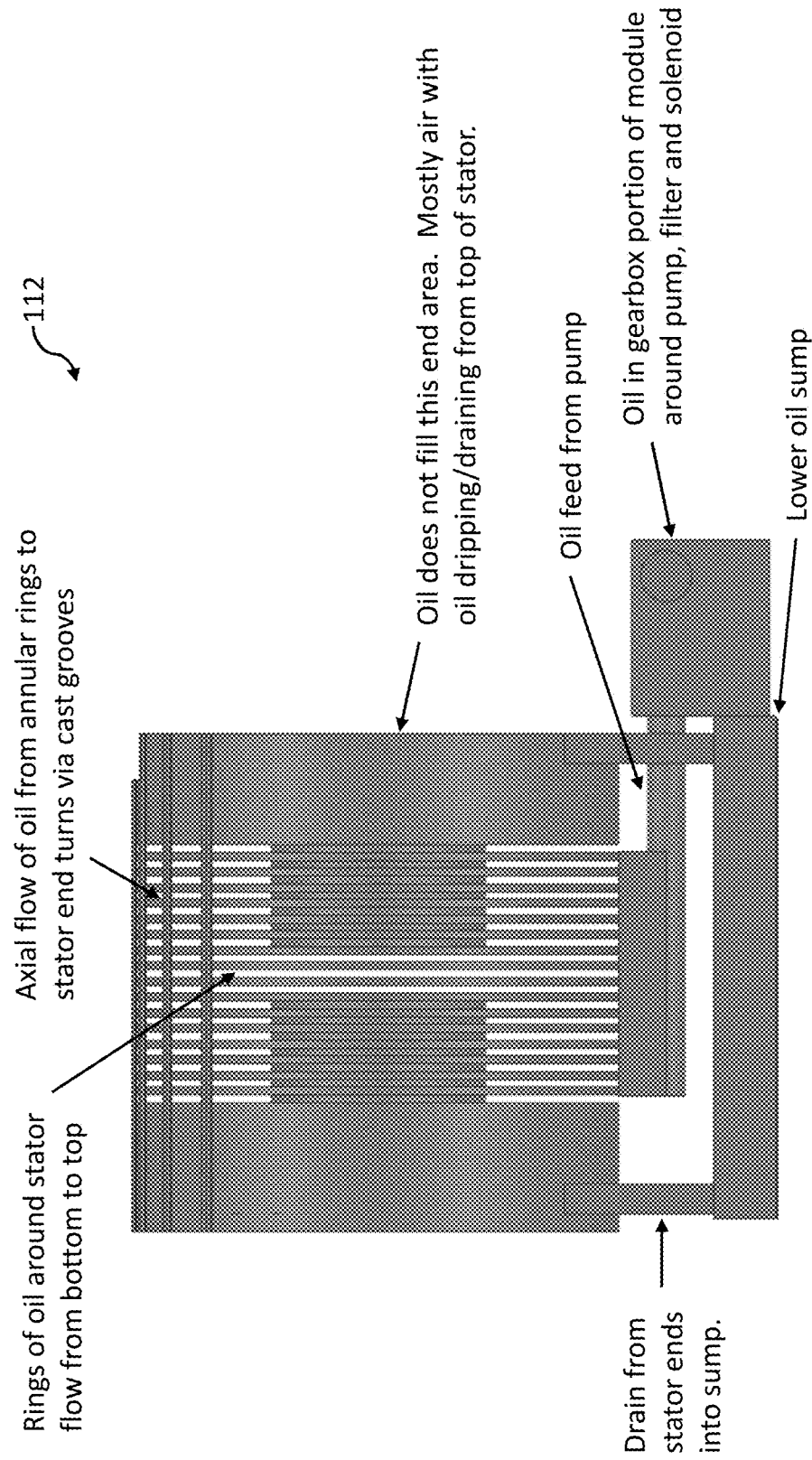
FIG. 29 is a side view showing the oil volume when the oil pump is operating.
Figure 30:
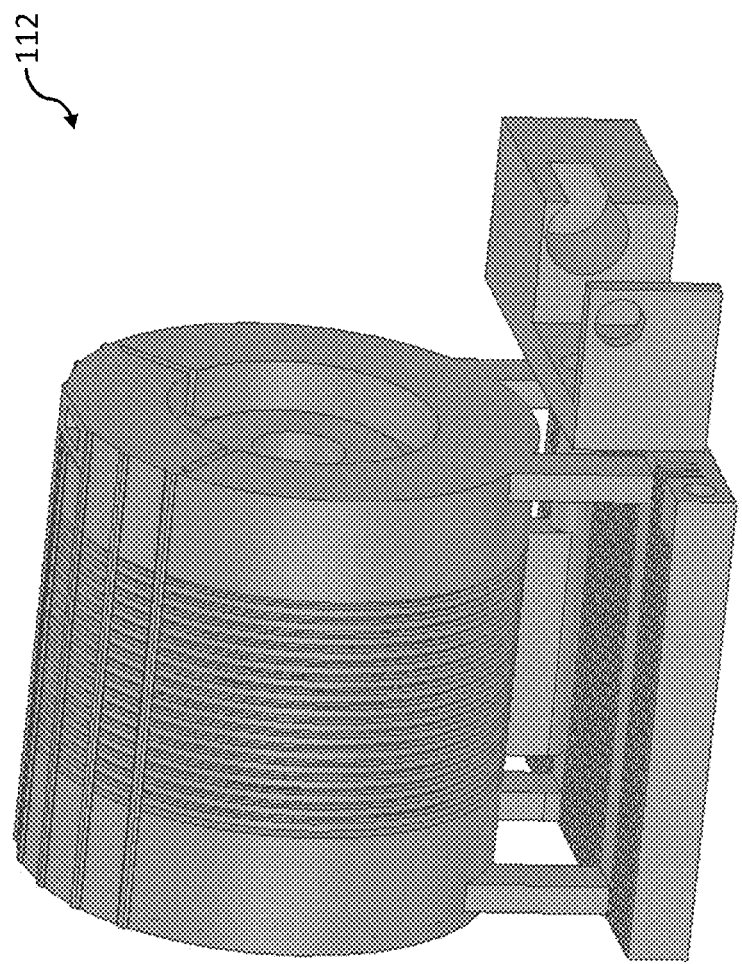
FIG. 30 is a perspective view showing the oil volume when the oil pump is operating.

FIGS. 29 and 30 illustrate the interior volume 112 of housing 40 through which oil is circulated when the oil pump is actively circulating oil through housing 40. It is noted that the oil does not fill the entire volume 112 simultaneously but can be found throughout this volume as the oil is actively circulated.

Figure 31:
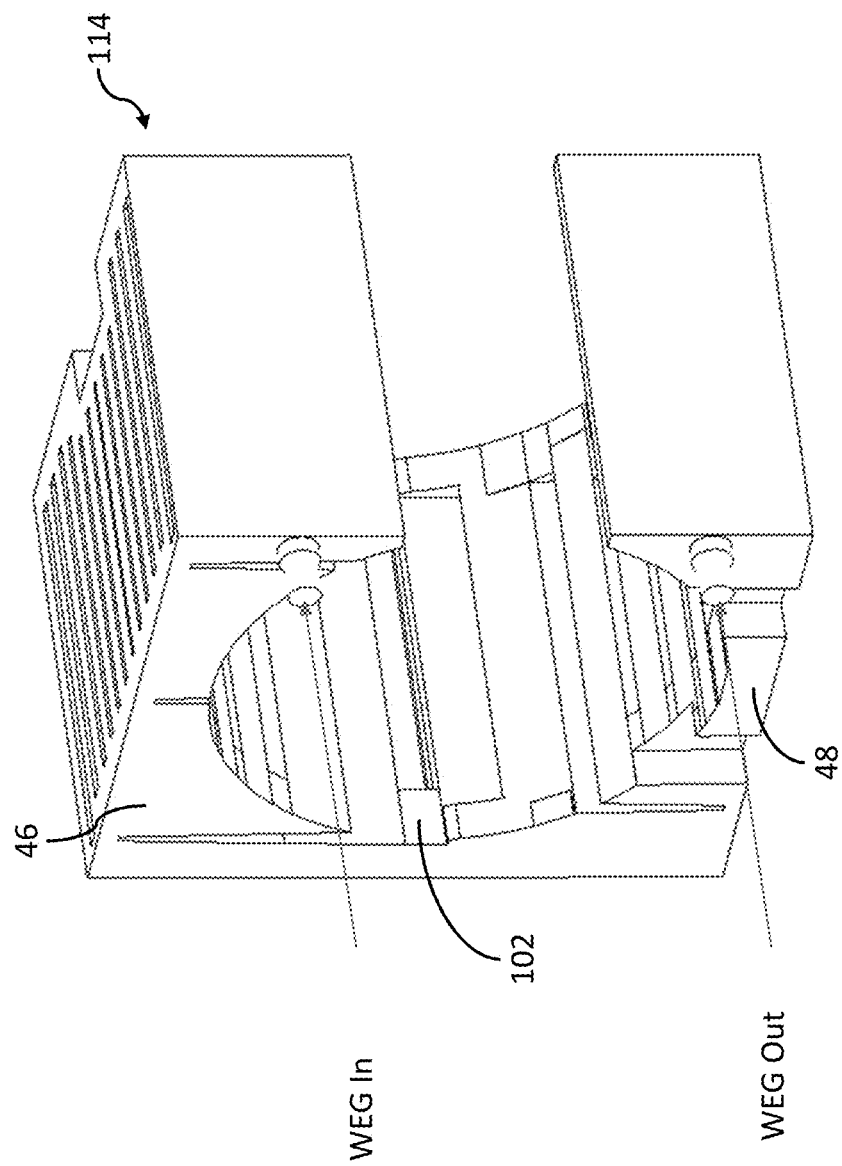
FIG. 31 is a perspective view showing the WEG coolant volume within the electric machine housing.
Figure 32:
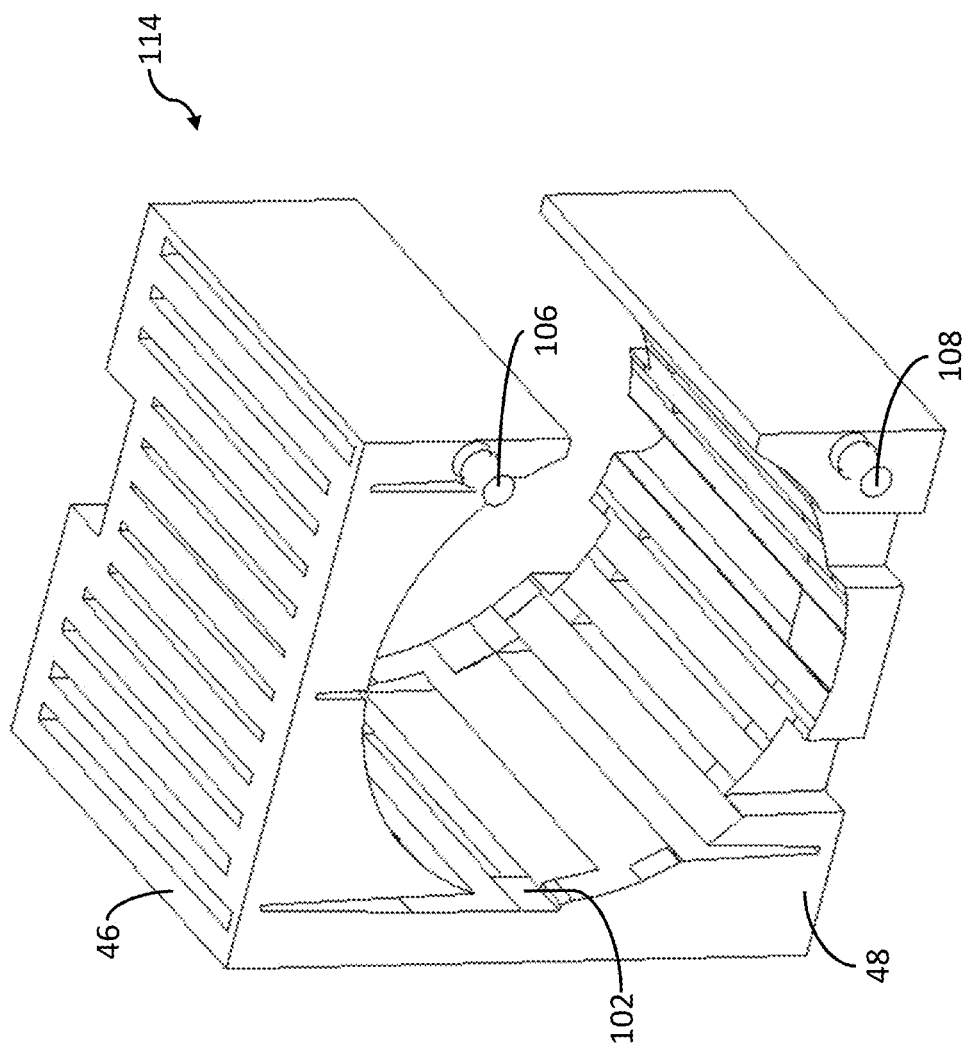
FIG. 32 is another perspective view showing the WEG coolant volume within the electric machine housing.
Figure 35:
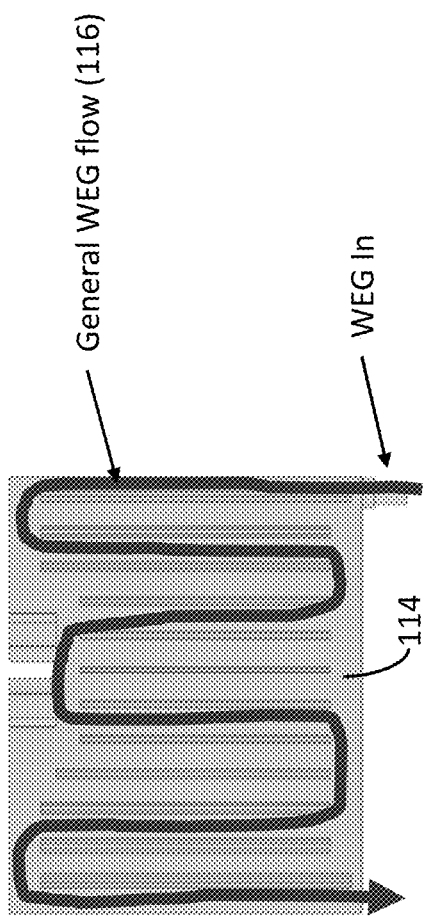
FIG. 35 is a top view illustrating the flow of WEG coolant.
Figure 36:
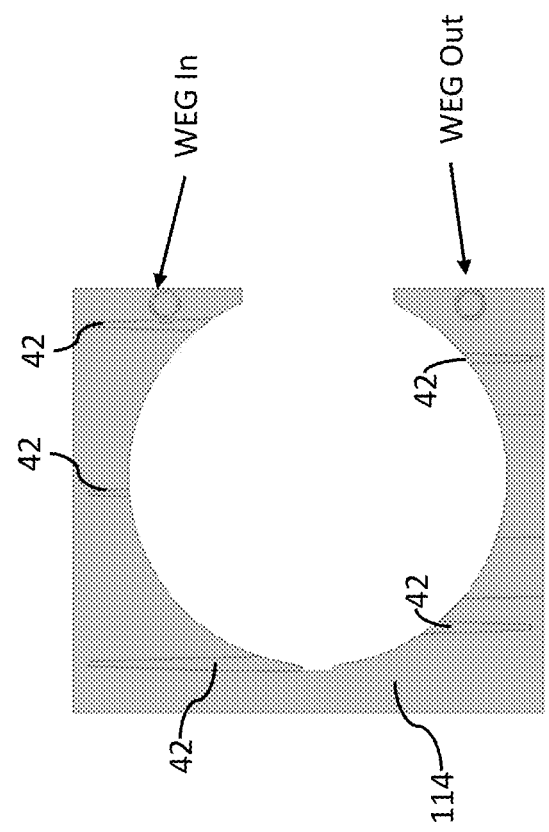
FIG. 36 is a schematic end view of WEG coolant volume.
Figure 39:
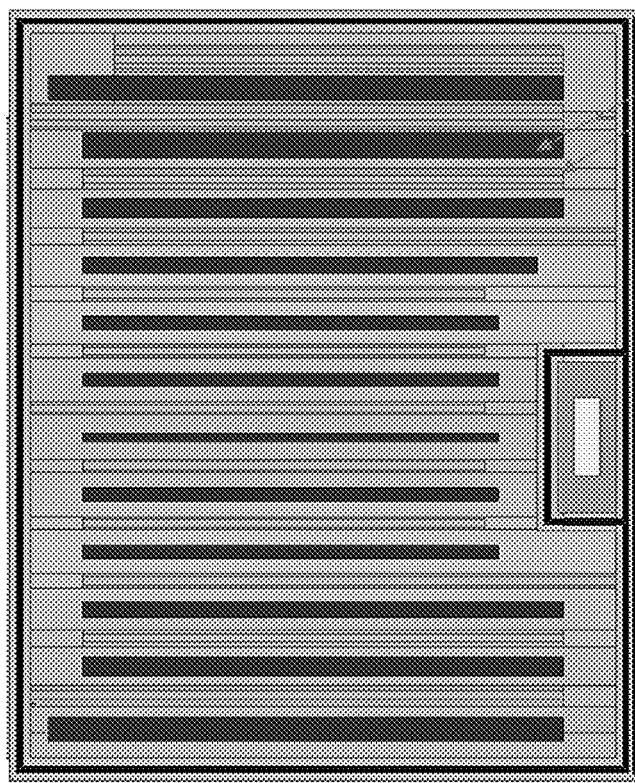
FIG. 39 is a cross sectional view of the module taken along the cross sectional view indicated in FIG. 37.

Turning now to FIGS. 31 and 32, the volume 114 through which WEG coolant is circulated through the housing is depicted. Coolant enters housing 40 through inlet 106, follows serpentine path 116 and then exits housing 40 through outlet 108. The WEG coolant enters housing 40 at a relatively low temperature and is discharged through outlet 108 at a higher temperature after absorbing heat as it passes through housing 40. External to module 20, the WEG coolant is conveyed to a heat exchanger 105 where it is cooled before being returned to inlet 106. For example, in a hybrid vehicle having a conventional radiator which functions as heat exchanger for cooling a WEG coolant that is used to cool the combustion engine, the WEG coolant of this engine coolant system could also be used to cool drive module 20 by circulating the WEG coolant through housing 40. Of course, the radiator would need to be sized appropriately for cooling both the engine and module 20 and whatever other components were placing loads on the system. Electrical vehicles without combustion engines also often include heat exchangers similar to conventional radiators for removing heat from a liquid coolant, e.g., a WEG coolant, that is used to cool various components of the vehicle. Module 20 could be included as one of those components in such a system.

As can be seen in the figures illustrating the exemplary embodiment, both WEG coolant volume 116 and housing 40, which defines volume 116, have a parallelepiped shape. Conventionally, a coolant circulating housing surrounding an electric machine such as housing 40 would be generally cylindrical to mimic the outer shape of the stator core. Because housing 40 defines a parallelepiped shape, the height of the fins projecting into the coolant circulating volume vary. When configuring the fins to define the serpentine path 116, the width of the path is varied to account for this variation in height so that the cross sectional area of the flow path remains substantially constant and thereby maintains a substantially constant velocity for the fluid being circulated along the flow path 116. In other words, the dimensions, e.g., height and width, of the coolant flow passageway are variable but the passageway defines a constant cross sectional area in a plane perpendicular to the direction of fluid flow through the passageway. In other words, the cross sectional area of passageway 116 in a plane perpendicular to line 116 and the other flow direction lines of FIG. 38 remains substantially constant. In this regard, it is noted that the fluid passageway may be defined by several parallel voids between adjacent fins. For example, in FIG. 38, a continuous flow line 116 represents the general path of the passageway and the smaller flow direction arrows located in individual channels between fins show how the passageway is formed by two adjacent channels, four adjacent channels, and six adjacent channels in the illustrated embodiment at different points in the path.

How the bends are formed in serpentine path 116 is best understood with reference to FIG. 38. This figure illustrates the WEG coolant volume 114 in the upper chamber 46. Barriers indicated by reference numerals 118 and 120 are formed by fins that extend all the way to the lateral wall of the interior volume to force the fluid to turn and flow parallel with the fins. As mentioned above, the location of where these barriers are placed is selected to maintain a consistent cross sectional area of the serpentine flow path 116. The location of barriers 118, 120 also determines how many parallel, adjacent channels will form the fluid passageway at each turn of the passageway.

It is noted that some leakage of coolant over the distal tips of the fins is allowed. Having the distal tips engage the opposing wall to prevent such leakage would require holding the fin dimensions to tight tolerances and also add significant complexity with regard to accounting for differential thermal expansion of the fins relative to the rest of the housing.

FIGS. 44-47 illustrate the WEG coolant volume 114 and the oil volume 112 when the oil pump is actively circulating oil. As can be understood with reference to these figures, the disclosed module provides a compact assembly which provides for the efficient transfer and removal of heat by the WEG coolant. As can also be appreciated from this figures, the WEG coolant also acts as a thermal buffer with the mass of the WEG coolant disposed in the module having a relatively high thermal capacitance whereby it is well suited to absorb temporary thermal spikes generated by the operation of electric machine 24.

It is noted that the disclosed embodiment includes several distinct features and these features may be utilized in alternative embodiments that do not include all such features and such features may be combined in various other combinations.

Figure 48:
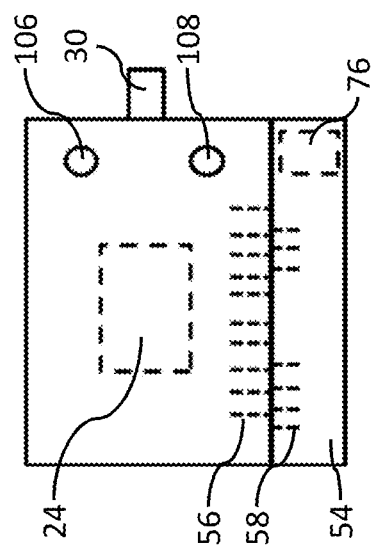
FIG. 48 is a schematic depiction of an alternative embodiment having an electric machine and an inverter but not an integral gearbox.

Thus, for example, an inverter 22 and electric machine 24 could be coupled together using a baseplate 50 and housing 40 with electric machine 24 without a gearbox being integrally mounted on the housing 40 as schematically depicted in FIG. 48. Some slight modifications would be necessary to housing 40 to account for the removal of the gearbox and repositioning of the oil pump. In such an embodiment, the lower oil sump would not necessarily have to feature the same heat exchanging advantages as lower oil sump 54. Rotor shaft 30 would be attached to an external gearbox or other suitable application.

Figure 49:
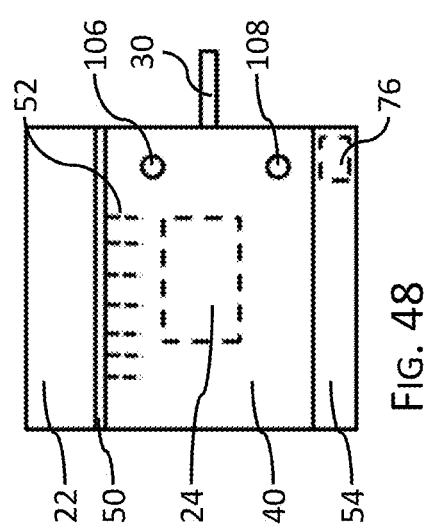
FIG. 49 is a schematic depiction of an alternative embodiment employing a lower sump with heat exchange properties.

It would also be possible to utilize the advantageous heat exchanging properties of lower oil sump 54 wherein it includes a housing member thermally coupled to the oil, e.g., via fins, and wherein that housing member also has heat exchanging surfaces that exchange heat with a liquid coolant, with other heat generating items other than the exemplary electric machine and/or with an oil cooled electric machine which is used with an alternative module than that of the exemplary embodiment. FIG. 49 illustrates the use of an oil sump 54 with a housing for an electric machine 24 having a water jacket and associated oil pump without the full set of advantageous features of module 20.

It would also be possible to utilize the advantageous features of the upper oil sump of gearbox assembly 26 in a stand alone gearbox or with a gearbox in alternative combinations. For example, a stand alone gearbox could include an upper oil sump 84 wherein an oil pump supplies oil to the upper oil sump wherein the upper oil sump defines one or more openings that supply oil to selected surfaces within the gearbox via gravity. The use of integral gutters cast in the housing of the gearbox could also be employed with the oil sump. Such an upper oil sump could be supplied with its own oil pump which does not necessarily have to be a variable capacity oil pump.

Figure 50:
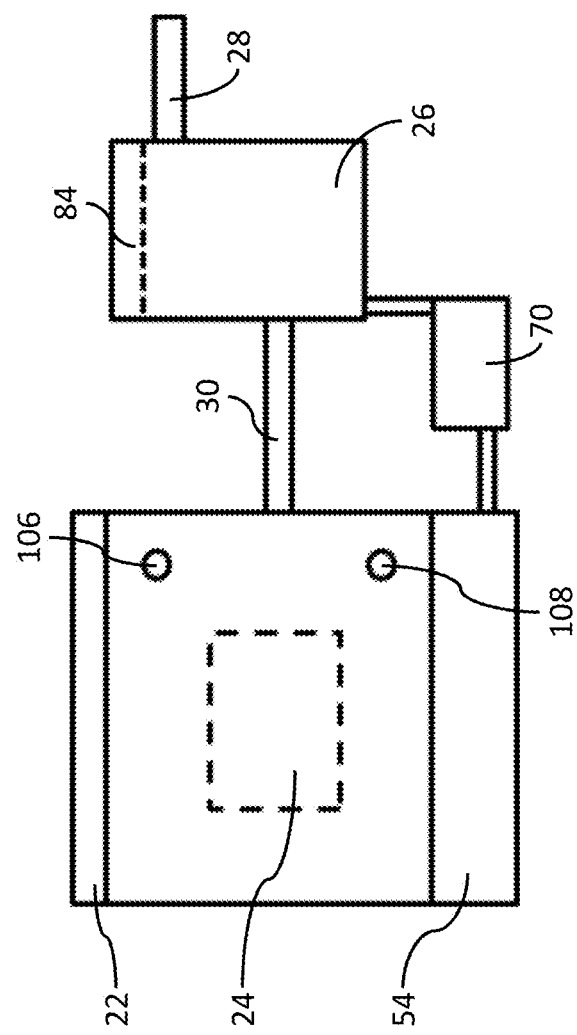
FIG. 50 is a schematic depiction of an alternative embodiment having a gearbox with a lower sump.

Such a gearbox having an upper sump 84 could also be advantageously paired with another oil cooled and/or lubricated device in another housing wherein a lower oil sump collects oil via gravity from both the other housing and the gearbox housing. A variable capacity oil pump fed by the lower oil sump could then be operably coupled with a valve assembly having a solenoid operated valve, the solenoid operated valve operable to adjust the relative proportion of the oil being supplied by the oil pump to the other housing and the gearbox as schematically depicted in FIG. 50. Alternatively, if it would not be necessary to adjust the proportions of the oil being fed to the two different housings, a simpler oil pump assembly could be used to feed fixed proportions and/or fixed quantities of oil to the two housings.

Also can also be understood with reference to FIG. 50, oil pump assembly 70 could be employed with a pair of alternative oil using applications and is not limited in use to the illustrated module 20. The use of a variable capacity pump coupled with a solenoid actuated proportioning valve allows assembly 70 to independently adjust the discharge of oil to two separate end uses and this ability could be utilized in other applications beyond that illustrated by the exemplary embodiments.

Figure 52:
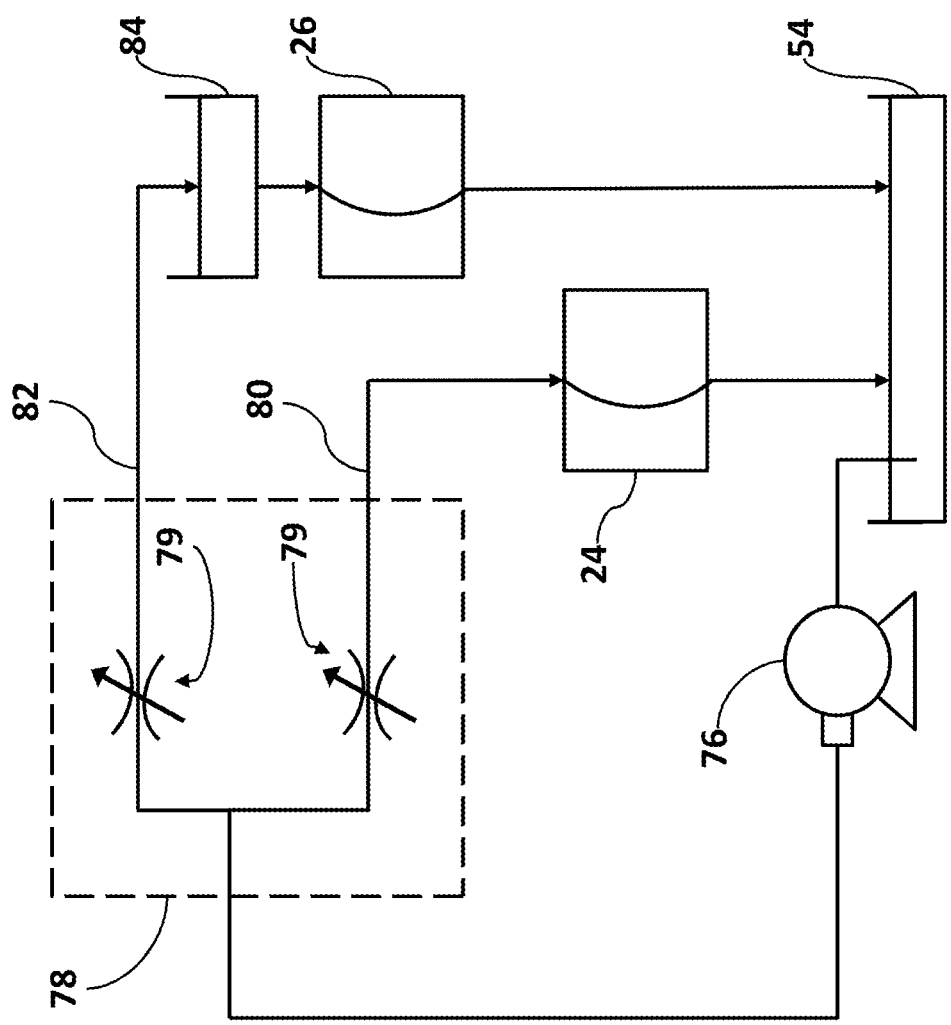
FIG. 52 is a schematic diagram of an oil circulation system.
Figure 53:
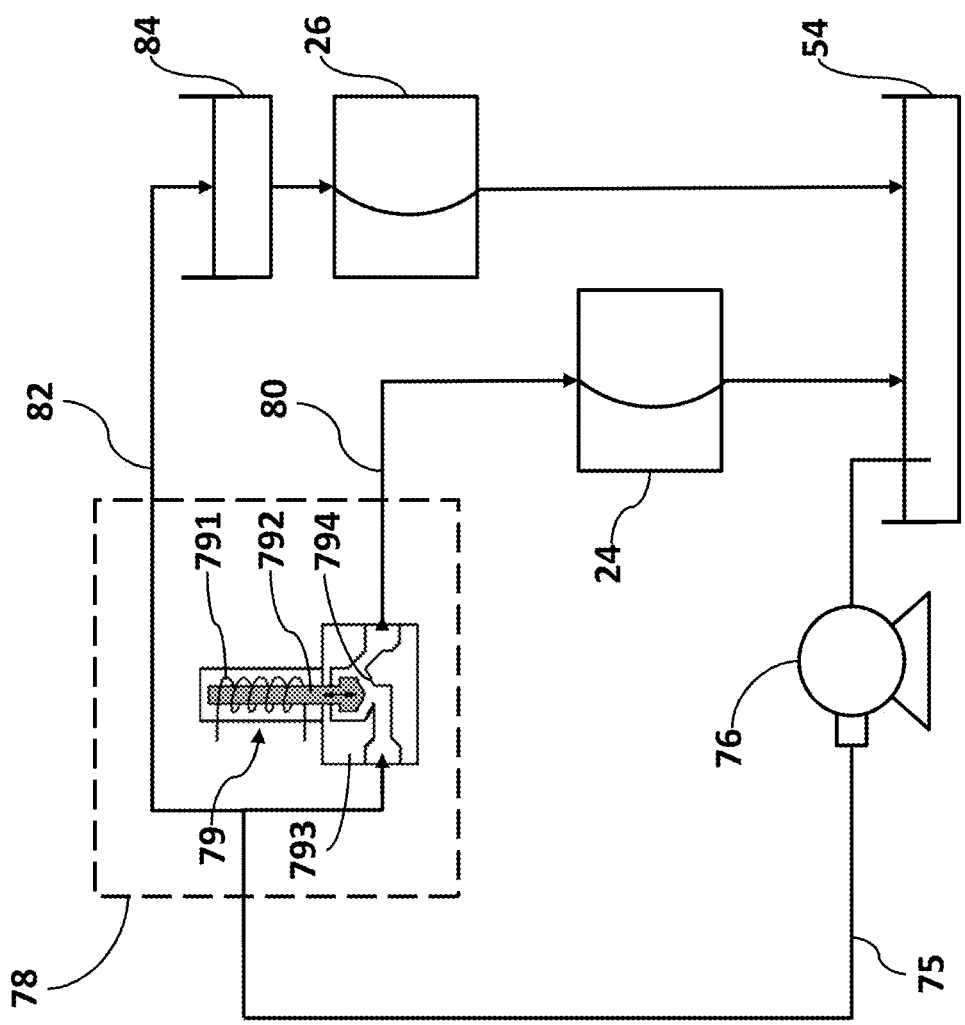
FIG. 53 is a schematic depiction of an alternative oil circulation system.

FIGS. 52 and 53 show two alternative embodiments of an oil pump assembly which includes a variable capacity oil pump 76 and a solenoid activated valve assembly 78 for supplying two different applications. In the schematic diagrams of FIGS. 1 and 2, the two applications are an electric machine 24 and the gearing arrangement of gearbox 26. FIG. - represents another embodiment. In all of these embodiments, the solenoid activated valve assembly divides the oil discharged from the pump into two different oil lines and includes at least one solenoid activated valve to adjust the relative proportion of the discharged oil between the two different oil lines. When coupled with a variable discharge oil pump, this arrangement allows for the independent adjustment of the flow rate in each of the two different oil lines. More specifically, the variable capacity oil pump is controlled to discharge oil at a rate corresponding to the combined oil demand of the two different applications and then the solenoid activated valve assembly proportions the oil discharged by the pump between the two oil lines feeding the applications to match the individual demands of the two applications.

In the embodiment depicted in FIGS. 6 and 17-19, the solenoid activated valve assembly includes a single solenoid activated valve in the form of a spool valve. The solenoid controlling the valve is, in turn, controlled by control circuitry 222 but may alternatively be controlled by control circuitry located in a different location such as a second controller located on or in module 20 or by ECU 230. The single spool valve of this embodiment receives the entirety of the oil discharged by the oil pump and then divides the flow and discharges it to oil discharge lines 80, 82. Repositioning the spool within the valve body by the solenoid adjusts the relative amounts of the oil being discharged into lines 80, 82.

FIG. 52 schematically depicts an alternative solenoid activated valve assembly 78 which includes two solenoid activated valves 79. In this embodiment, the oil discharged from pump 76 is divided by a static fitting and each of the resulting oil discharge lines 80, 82 include a solenoid actuated valve 79. Valves 79 can be adjustably restricted or opened and by coordinating the discharge rate of pump 76 and the relative size of the open passageways defined by valves 79 to proportion that discharge rate between oil lines 80, 82, the flow rate of oil in each of lines 80, 82 can be independently adjusted to meet the needs of electric machine 24 and gearbox 26.

FIG. 53 illustrates another embodiment of a solenoid activated valve assembly 78. In this embodiment, only one solenoid activated valve 79 is employed. It is also noted that while FIG. 52 depicts two solenoid activated valves 79 symbolically, FIG. 53 provides a more physically descriptive representation of a suitable solenoid activated valve. Those having ordinary skill in the art will appreciated that a variety of alternative solenoid activated valves can be used to provide a solenoid activated valve assembly as described herein.

As can be seen in the depiction of FIG. 53, solenoid activated valve 79 includes a solenoid coil 791 and a solenoid plunger 792 which also functions as a valve stem having an integral valve head. Coil 791 is selectively energized by control circuitry 222 or other circuitry which is used for controlling the operation of the solenoid actuated valve assembly 78. By selectively energizing coil 791, the solenoid plunger 792 can be extended and retracted. When fully extended, it will engage the integral valve head with valve seat 794 located within valve body 793 to thereby prevent the discharge of oil into line 80 and direct all of the oil discharged by pump 76 into oil discharge line 75 to line 82.

In this embodiment, if pump 76 is operating, there will always be some oil being discharged into line 82. This type of arrangement can be useful where one of the two applications will also require at least a minimal amount of oil. For example, in some applications one application, such as a gearbox may always require oil for purposes of lubrication and may only periodically need oil for purposes of heat removal. In FIG. 53, electric machine 24 utilizes oil only for purposes of heat removal and thus, only needs oil supplied to it when the demand being placed on it is sufficiently great to require the use of oil to remove heat. Under lower demand conditions, the electric machine may not require the use of oil to remove heat. Valve 79 can prevent oil from being unnecessarily supplied to electric machine 24 under such lower demand conditions to thereby provide for the efficient operation of the entire system.

While this invention has been described as having an exemplary design, the present invention may be further modified within the spirit and scope of this disclosure. This application is therefore intended to cover any variations, uses, or adaptations of the invention using its general principles.

What is claimed is:

1. A drive module for a vehicle, the module comprising:
an electric machine;
a voltage source inverter operably coupled with the electric machine;
a cooling system for the module, the cooling system including a first housing member thermally coupled with the inverter and having a first set of heat exchange surfaces, a second housing member thermally coupled with the electric machine and having a second set of heat exchange surfaces, the first and second sets of heat exchange surfaces each projecting into an interior volume whereby a liquid coolant introduced into the interior volume removes heat from both the first and second set of heat exchange surfaces;
an oil pump, the oil pump circulating an oil to cool the electric machine wherein the oil collects in a gravity fed, lower oil sump wherein it supplies the oil pump; and
a third housing member defining a wall of the lower oil sump and being thermally coupled with the oil collected in the oil sump, the third housing member further including a third set of heat exchange surfaces projecting into the interior volume in which the liquid coolant is circulated.

2. The drive module of claim 1 wherein the third housing member further includes a fourth set of heat exchange surfaces which project into lower oil sump.

3. The drive module of claim 2 wherein the third and fourth sets of heat exchange surfaces are disposed opposite each other and project in opposite directions.

4. The drive module of claim 1 wherein the oil pump circulates oil about a stator core of the electric machine and wherein a radially exterior surface of the stator core defines a plurality of heat exchange fins.

5. The drive module of claim 1 further comprising a gearing assembly operably coupled with the electric machine; and
an upper oil sump wherein the oil pump supplies oil to the upper oil sump and the oil is gravity fed from the upper oil sump to the gearing assembly.

6. The drive module of claim 5 wherein the oil pump is a variable capacity oil pump and the oil pump is operably coupled with at least one solenoid operated valve, the at least one solenoid operated valve adjusting the relative proportion of the oil being supplied by the oil pump to the electric machine and the upper oil sump.

7. The drive module of claim 6 wherein the upper oil sump defines one or more openings that supply oil to selected surfaces on the gear assembly via gravity.

8. The drive module of claim 7 wherein the selected surfaces include surfaces that are disposed on gears and bearings.

9. The drive module of claim 7 wherein at least one housing member defines an oil gutter for directing oil from the upper oil sump to one of the selected surfaces.

10. The drive module of claim 1 wherein the housing members defining an outer boundary of the interior volume for receiving the liquid coolant define an outer boundary having a parallelepiped shape and the housing members defining the interior volume for receiving the liquid coolant that are in thermal communication with the electric machine define an inner boundary of the interior volume having a cylindrical shape and wherein the first, second and third set of heat exchange surfaces all define fins projecting into the interior volume wherein the fins projecting into the interior volume define a coolant flow passageway, the coolant flow passageway having variable dimensions and defining a constant cross sectional area in a plane perpendicular to the direction of fluid flow through the coolant flow passageway.

11. An oil cooled assembly comprising:
at least one heat generating member;
an oil pump, the oil pump circulating an oil to cool the heat generating member wherein the oil collects by gravity in a lower oil sump and wherein the lower oil sump supplies oil to the pump;
a cooling assembly wherein a liquid coolant is circulated through an interior volume of the cooling assembly to remove heat from a housing member thermally coupled to the heat generating member; and
wherein the lower oil sump is partially defined by a sump housing member thermally coupled with the oil collected in the lower oil sump, the sump housing member including a set of heat exchange surfaces projecting into the interior volume in which the liquid coolant is circulated whereby the liquid coolant removes heat from the sump housing member.

12. The oil cooled assembly of claim 11 wherein the sump housing member includes a further set of heat exchange surfaces projecting into the oil collected in the lower oil sump to thereby thermally couple the sump housing member with the oil.

13. The oil cooled assembly of claim 12 wherein the heat generating member is an electric machine.

14. The oil cooled assembly of claim 12 wherein the oil cooled assembly is adapted to supply oil to a second application and wherein the oil pump is a variable capacity oil pump and wherein the oil cooled assembly further includes a solenoid activated valve assembly disposed between the oil pump and the heat generating member and the second application wherein oil discharged from the pump is divided by the solenoid activated valve assembly and the divided flow is conveyed by a first oil discharge line to supply oil to the heat generating member and by a second discharge line to supply oil to the second application and the solenoid activated valve assembly further comprises at least one solenoid activated valve which adjustably proportions the oil discharged from the pump between the first and second discharge lines.

15. The oil cooled assembly of claim 14 wherein the heat generating member is an electric machine and further comprising a gearing arrangement drivingly coupled with the electric machine and wherein the gearing arrangement is the second application.

16. The oil cooled assembly of claim 15 wherein the at least one solenoid activated valve comprises a first solenoid activated valve disposed in the first discharge line and a second solenoid activated valve disposed in the second discharge line.

17. The oil cooled assembly of claim 15 wherein the at least one solenoid activated valve consists solely of a single solenoid activated valve.

18. The oil cooled assembly of claim 15 wherein the gearing arrangement is disposed in a gearbox assembly, the gearbox assembly including an upper oil sump wherein the second discharge line supplies oil to the upper oil sump and the upper oil sump defines one or more openings that supply oil to selected surfaces within the gearbox box assembly via gravity.

19. The oil cooled assembly of claim 18 wherein the selected surfaces are disposed on gears and bearings and at least one housing member of the gearbox defines an oil gutter for directing oil from the upper oil sump to one of the selected surfaces.

20. A gearbox assembly comprising:
a gearing arrangement comprising at least two gear members and a rotating shaft supported by a bearing; and
an upper oil sump wherein an oil pump supplies oil to the upper oil sump and the upper oil sump defines one or more openings that supply oil to selected surfaces of the gearing arrangement within the gearbox assembly via gravity.

21. The gearbox assembly of claim 20 wherein the selected surfaces include surfaces disposed on the gear members and the bearing and at least one housing member of the gearbox defines an oil gutter for directing oil from the upper oil sump to one of the selected surfaces.

22. The gearbox assembly of claim 20 wherein the gearbox assembly is adapted to supply a second application with oil discharged by the oil pump and wherein the oil pump is a variable capacity oil pump fed by a lower oil sump which collects oil via gravity from both the gearbox assembly and the second application, and the gearbox assembly further includes a solenoid activated valve assembly disposed between the oil pump and the upper oil sump and the second application wherein oil discharged from the pump is divided by the solenoid activated valve assembly and the divided flow is conveyed by a first oil discharge line to supply oil to the upper oil sump and by a second discharge line to supply oil to the second application and the solenoid activated valve assembly further comprises at least one solenoid activated valve which adjustably proportions the oil discharged from the pump between the first and second discharge lines.

23. A drive module comprising:
an oil pump assembly for adjustably supplying two separate applications, the oil pump assembly comprising:
a variable capacity oil pump supplying oil to a first application and a second application; and
a solenoid activated valve assembly disposed between the oil pump and the first and second applications wherein oil discharged from the oil pump is divided by the solenoid activated valve assembly and the divided flow is conveyed by a first oil discharge line to supply oil to the first application and by a second discharge line to supply oil to the second application and the solenoid activated valve assembly further comprises at least one solenoid activated valve which adjustably proportions the oil discharged from the pump between the first and second discharge lines; and
wherein the first application is a gearbox assembly comprising:
a gearing arrangement comprising at least two gear members and a rotating shaft supported by a bearing; and
an upper oil sump wherein an oil pump supplies oil to the upper oil sump and the upper oil sump defines one or more openings that supply oil to selected surfaces of the gearing arrangement within the gearbox assembly via gravity.

24. The drive module of claim 23 wherein the at least one solenoid activated valve comprises a first solenoid activated valve disposed in the first discharge line and a second solenoid activated valve disposed in the second discharge line.

25. The drive module of claim 23 wherein the at least one solenoid activated valve consists solely of a single solenoid activated valve.

26. The drive module of claim 23 further comprising control circuitry which controls operation of the oil pump to adjust the discharge rate of the pump and controls operation of the solenoid activated valve assembly to adjust the relative amounts of the oil distributed by the first and second discharge lines to thereby independently adjust the flow rate of oil in the first and second discharge lines.

\* \* \* \* \*